(12) United States Patent
Shima

(10) Patent No.: US 12,262,056 B2
(45) Date of Patent: Mar. 25, 2025

(54) IMAGE DECODING APPARATUS, IMAGE DECODING METHOD, AND STORAGE MEDIUM

(71) Applicant: CANON KABUSHIKI KAISHA, Tokyo (JP)

(72) Inventor: Masato Shima, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/604,047

(22) Filed: Mar. 13, 2024

(65) Prior Publication Data
US 2024/0223810 A1 Jul. 4, 2024

Related U.S. Application Data

(63) Continuation of application No. 17/467,982, filed on Sep. 7, 2021, now Pat. No. 11,962,806, which is a (Continued)

(30) Foreign Application Priority Data

Mar. 11, 2019 (JP) ................................ 2019-044274

(51) Int. Cl.
*H04N 19/61* (2014.01)
*H04N 19/124* (2014.01)
(Continued)

(52) U.S. Cl.
CPC .......... *H04N 19/61* (2014.11); *H04N 19/124* (2014.11); *H04N 19/136* (2014.11); *H04N 19/176* (2014.11); *H04N 19/184* (2014.11)

(58) Field of Classification Search
CPC .... H04N 19/61; H04N 19/124; H04N 19/136; H04N 19/176; H04N 19/184;
(Continued)

(56) References Cited

U.S. PATENT DOCUMENTS

2022/0264151 A1* 8/2022 Lim ...................... H04N 19/61

FOREIGN PATENT DOCUMENTS

| CN | 1977540 A | 6/2007 |
|---|---|---|
| JP | 7267785 B2 | 5/2023 |

(Continued)

*Primary Examiner* — Fitwi Y Hailegiorgis
(74) *Attorney, Agent, or Firm* — Canon U.S.A., Inc. IP Division

(57) ABSTRACT

A decoding unit decodes data corresponding to an N×M array of quantized coefficients from a bit stream. An inverse quantization unit derives orthogonal transform coefficients from the N×M array of quantized coefficients by using at least a quantization matrix. An inverse orthogonal transform unit performs inverse orthogonal transform on the orthogonal transform coefficients generated by the inverse quantization unit to generate prediction residuals corresponding to a block of a P×Q array of pixels. An inverse quantization unit derives the orthogonal transform coefficients by using at least a quantization matrix of an N×M array of elements, and the inverse orthogonal transform unit generates prediction residuals for the P×Q array of pixels having a size larger than the N×M array.

11 Claims, 16 Drawing Sheets

Related U.S. Application Data continuation of application No. PCT/JP2020/008422, filed on Feb. 28, 2020.

(51) Int. Cl.
*H04N 19/136* (2014.01)
*H04N 19/176* (2014.01)
*H04N 19/184* (2014.01)

(58) Field of Classification Search
CPC .... H04N 19/119; H04N 19/126; H04N 19/44; H04N 19/132; H04N 19/157; H04N 19/60
USPC .................................................... 375/240.03
See application file for complete search history.

(56) References Cited

FOREIGN PATENT DOCUMENTS

| | | | |
|---|---|---|---|
| KR | 20190022534 A | 3/2019 |
| TW | I619375 B | 3/2018 |
| WO | 2018207786 A1 | 11/2018 |

\* cited by examiner

| 1 | 2 | 3 | 4 | 5 | 6 | 7 | 8 |
|---|---|---|---|---|---|---|---|
| 2 | 3 | 4 | 5 | 6 | 7 | 8 | 9 |
| 3 | 4 | 5 | 6 | 7 | 8 | 9 | 10 |
| 4 | 5 | 6 | 7 | 8 | 9 | 10 | 11 |
| 5 | 6 | 7 | 8 | 9 | 10 | 11 | 12 |
| 6 | 7 | 8 | 9 | 10 | 11 | 12 | 13 |
| 7 | 8 | 9 | 10 | 11 | 12 | 13 | 14 |
| 8 | 9 | 10 | 11 | 12 | 13 | 14 | 15 |

| ENCODING TARGET VALUE | BINARY CODE |
|---|---|
| ... | ... |
| -5 | 0001011 |
| -4 | 0001001 |
| -3 | 00111 |
| -2 | 00101 |
| -1 | 011 |
| 0 | 1 |
| 1 | 010 |
| 2 | 00100 |
| 3 | 00110 |
| 4 | 0001000 |
| 5 | 0001010 |
| ... | ... |

FIG.11B

| ENCODING TARGET VALUE | BINARY CODE |
|---|---|
| ... | ... |
| -5 | 0001011 |
| -4 | 0001001 |
| -3 | 00111 |
| -2 | 0010 |
| -1 | 011 |
| 0 | 11 |
| 1 | 10 |
| 2 | 010 |
| 3 | 00110 |
| 4 | 0001000 |
| 5 | 0001010 |
| ... | ... |

FIG.12A

| 1 | 2 | 3 | 4 | 5 | 6 | 7 | 8 |
|---|---|---|---|---|---|---|---|
| 2 | 3 | 4 | 5 | 6 | 7 | 8 | 9 |
| 3 | 4 | 5 | 6 | 7 | 8 | 9 | 10 |
| 4 | 5 | 6 | 7 | 8 | 9 | 10 | 11 |
| 5 | 6 | 7 | 8 | 9 | 10 | 11 | 12 |
| 6 | 7 | 8 | 9 | 10 | 11 | 12 | 13 |
| 7 | 8 | 9 | 10 | 11 | 12 | 13 | 14 |
| 8 | 9 | 10 | 11 | 12 | 13 | 14 | 15 |

IMAGE DECODING APPARATUS, IMAGE DECODING METHOD, AND STORAGE MEDIUM

CROSS-REFERENCE TO RELATED APPLICATIONS

This application is a Continuation of U.S. Ser. No. 17/467,982, filed on Sep. 7, 2021, which is a Continuation of International Patent Application No. PCT/JP2020/008422, filed Feb. 28, 2020, which claims the benefit of Japanese Patent Application No. 2019-044274, filed Mar. 11, 2019, both of which are hereby incorporated by reference herein in their entirety.

BACKGROUND OF THE INVENTION

Field of the Invention

The present invention relates to an image encoding technique.

Background Art

The High Efficiency Video Coding (hereinafter referred to as HEVC) method is known as an encoding method of compressing a moving image. HEVC employs a basic block having a larger size than a conventional macro block (16×16 array of pixels) to improve the encoding efficiency. This basic block having a large size is referred to as a Coding Tree Unit (CTU), and the size is up to 64×64 array of pixels. A CTU is further divided into sub-blocks which are units for performing prediction and transform.

In HEVC, quantization matrices are used to assign weights to coefficients having been subjected to the orthogonal transform (hereinafter referred to as orthogonal transform coefficients) in accordance with the frequency component. The use of the quantization matrices can enhance compression efficiency while maintaining image quality, by reducing data with high frequency components where degradation is less noticeable to the human vision more than data with low frequency components. Japanese Patent Application Laid-Open No. 2013-38758 discusses a technique for encoding information indicating such quantization matrices.

International standardization for a more efficient encoding method as a successor to HEVC has recently been started. Specifically, the Joint Video Experts Team (JVET) established by the International Organization for Standardization and the International Electrotechnical Commission and the ITU Telecommunication Standardization Sector (ITU-T) has been propelled standardization of a Versatile Video Coding (VVC) encoding method (hereinafter, VVC). For this standardization, a new technique of reducing the amount of code for improved encoding efficiency by forcefully setting the orthogonal transform coefficients of high frequent components to 0 if the block size to be subjected to orthogonal transform is large (hereinafter, such a new technique is referred to as zeroing out) has been under study.

CITATION LIST

Patent Literature

PTL 1: Japanese Patent Laid-Open No. 2013-38758

SUMMARY OF THE INVENTION

In VVC, the introduction of a quantization matrix has been also under review as in HEVC. However, the quantization matrix in HEVC premises a quantization method in which a quantization matrix having the same size as the size for the conventional orthogonal transform is used, and does not support the zeroing out, which is a new technique for setting some of orthogonal transform coefficients to zero. Thus, quantization control based on the frequency components cannot be performed on the orthogonal transform coefficients having been subjected to the zeroing out, and the subjective image quality cannot be improved, which has been an issue.

To improve the subjective image quality even in a case where the technique of forcibly setting some of orthogonal transform coefficients to 0 is used by enabling quantization processing using a quantization matrix corresponding to the technique, the present invention provides the following configuration, for example. More specifically, an image decoding apparatus capable of decoding an image from a bit stream by using a plurality of blocks including a first block of a P×Q array of pixels, where P and Q are integers. The image decoding apparatus includes a decoding unit configured to decode data corresponding to an N×M array of quantized transform coefficients from the bit stream, where N is an integer satisfying N<P, and M is an integer satisfying M<Q, an inverse quantization unit configured to derive an N×M array of transform coefficients from the N×M array of quantized transform coefficients by using a quantization matrix of an N×M array of elements, the transform coefficients representing frequency components, and an inverse transform unit configured to derive a P×Q array of prediction residuals corresponding to the first block from the N×M array of transform coefficients by performing an inverse transform process on the N×M array of transform coefficients derived by the inverse quantization unit.

Further features of the present invention will become apparent from the following description of exemplary embodiments with reference to the attached drawings.

BRIEF DESCRIPTION OF THE DRAWINGS

FIG. 8A is a diagram illustrating an example of a quantization matrix used in the first and the second exemplary embodiments.

FIG. 8B is a diagram illustrating an example of a quantization matrix used in the first and the second exemplary embodiments.

FIG. 8C is a diagram illustrating an example of a quantization matrix used in the first and the second exemplary embodiments.

FIG. 11A is a diagram illustrating an example of an encoding table used to encode a differential value of the quantization matrix.

FIG. 11B is a diagram illustrating an example of an encoding table used to encode a differential value of the quantization matrix.

FIG. 12A is a diagram illustrating another example of the quantization matrix used in the first and the second exemplary embodiments.

FIG. 12B is a diagram illustrating another example of the quantization matrix used in the first and the second exemplary embodiments.

FIG. 12C is a diagram illustrating another example of the quantization matrix used in the first and the second exemplary embodiments.

DESCRIPTION OF THE EMBODIMENTS

Exemplary embodiments of the present invention will be described below with reference to the accompanying drawings. The configurations of the following exemplary embodiments are to be considered to be illustrative, and the present invention is not limited to the configurations of the following exemplary embodiments. The terms such as basic block, sub-block, quantization matrix, and base quantization matrix are conveniently used in each exemplary embodiment, and other terms may also be used within the ambit where the meaning remains unchanged. For example, a basic block and a sub-block may be referred to as a basic unit and a sub unit, or simply referred to as a block and a unit, respectively. In the following descriptions, a rectangle refers to a quadrangle having four right-angled inner angles and two diagonals of equal length, according to the general definition. A square refers to a quadrangle having four equal angles and four sides of equal length, among quadrangles, according to the general definition. In other words, a square is a type of rectangle.

First Exemplary Embodiment

Exemplary embodiments of the present invention will be described below with reference to the accompanying drawings.

The zeroing out will be described in more detail below. The zeroing out refers to processing of forcibly setting some of the orthogonal transform coefficients in an encoding target block to 0, as described above. For example, a block of a 64×64 array of pixels in an input image (picture) is assumed to be an encoding target block. In this case, the orthogonal transform coefficients also have a size of a 64×64 array. In the zeroing out, even if some of the orthogonal transform coefficients in the 64×64 array have a non-zero value as a result of the orthogonal transform, encoding is performed with the values of these orthogonal transform coefficients regarded as 0. For example, in two-dimensional orthogonal transform coefficients, low-frequency components including DC components corresponding to an upper left predetermined range are not forcibly set to 0, orthogonal transform coefficients corresponding to frequency components higher than the low-frequency components are constantly set to 0.

Figure 1:
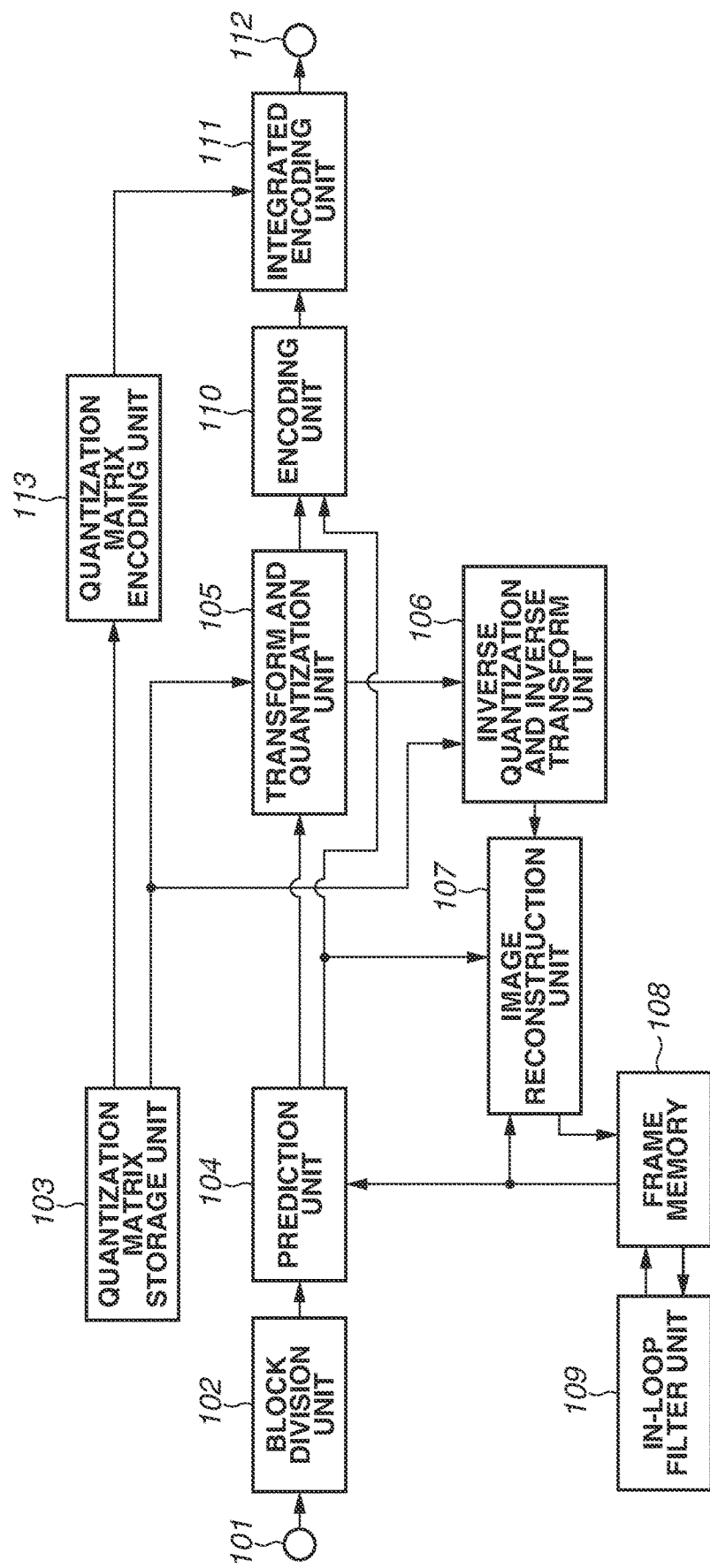
FIG. 1 is a block diagram illustrating a configuration of an image encoding apparatus according to a first exemplary embodiment.

An image encoding apparatus according to the present exemplary embodiment will be described below. FIG. 1 is a block diagram illustrating the image encoding apparatus according to the present exemplary embodiment. Referring to FIG. 1, a terminal 101 inputs image data.

A block division unit 102 divides the input image into a plurality of basic blocks and outputs the images in units of the basic blocks to the subsequent stage.

A quantization matrix storage unit 103 generates and stores a quantization matrix. A quantization matrix is used to assign weights to quantization processing for the orthogonal transform coefficients in accordance with the frequency components. The quantization step for each orthogonal transform coefficient in the quantization processing (described below) is assigned a weight, for example, by performing the multiplication of a scale value (quantization scale) based on a reference parameter value (quantization parameter) and the value of each element in the quantization matrix.

Figure 8B:
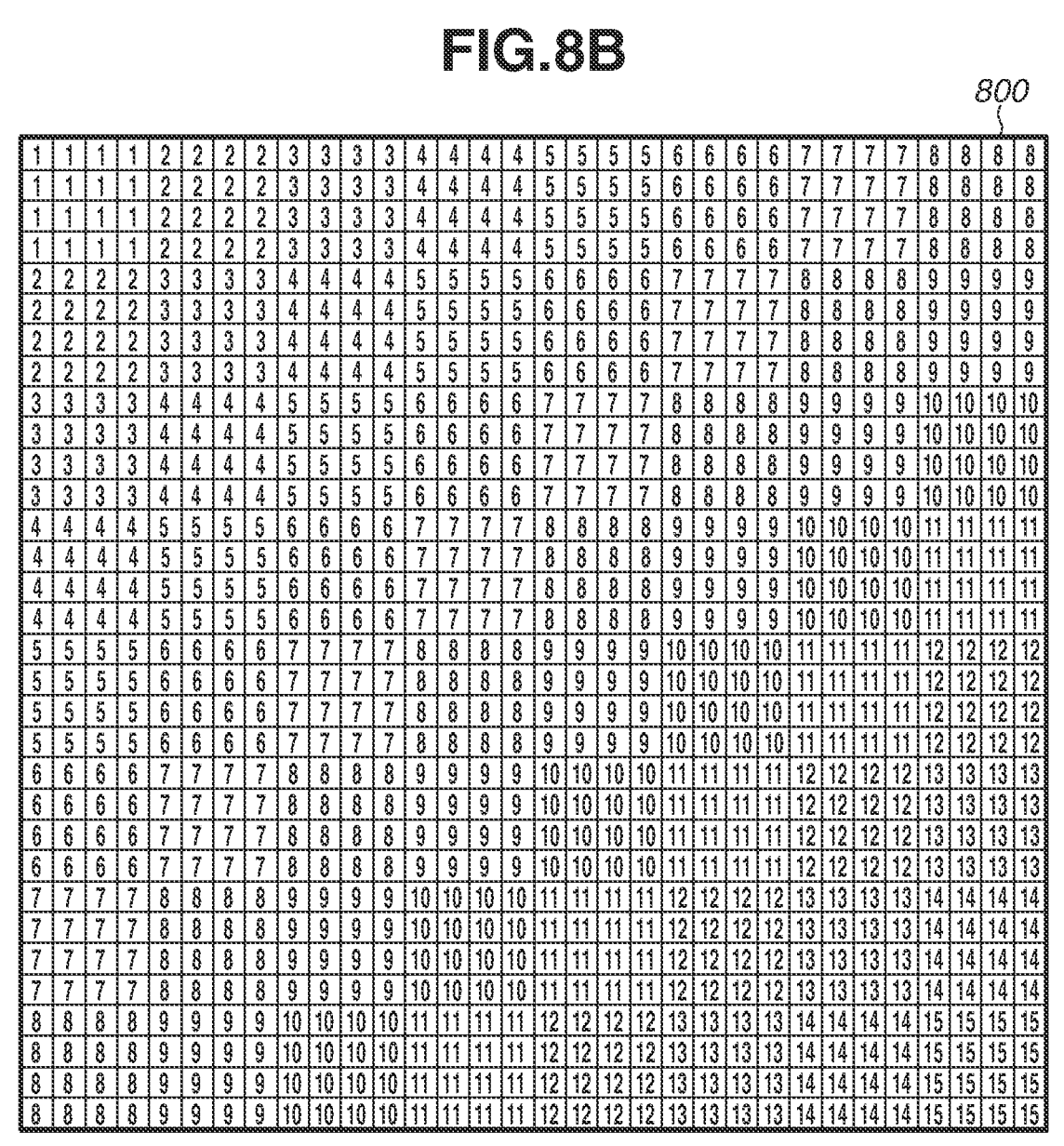
Figure 8C:
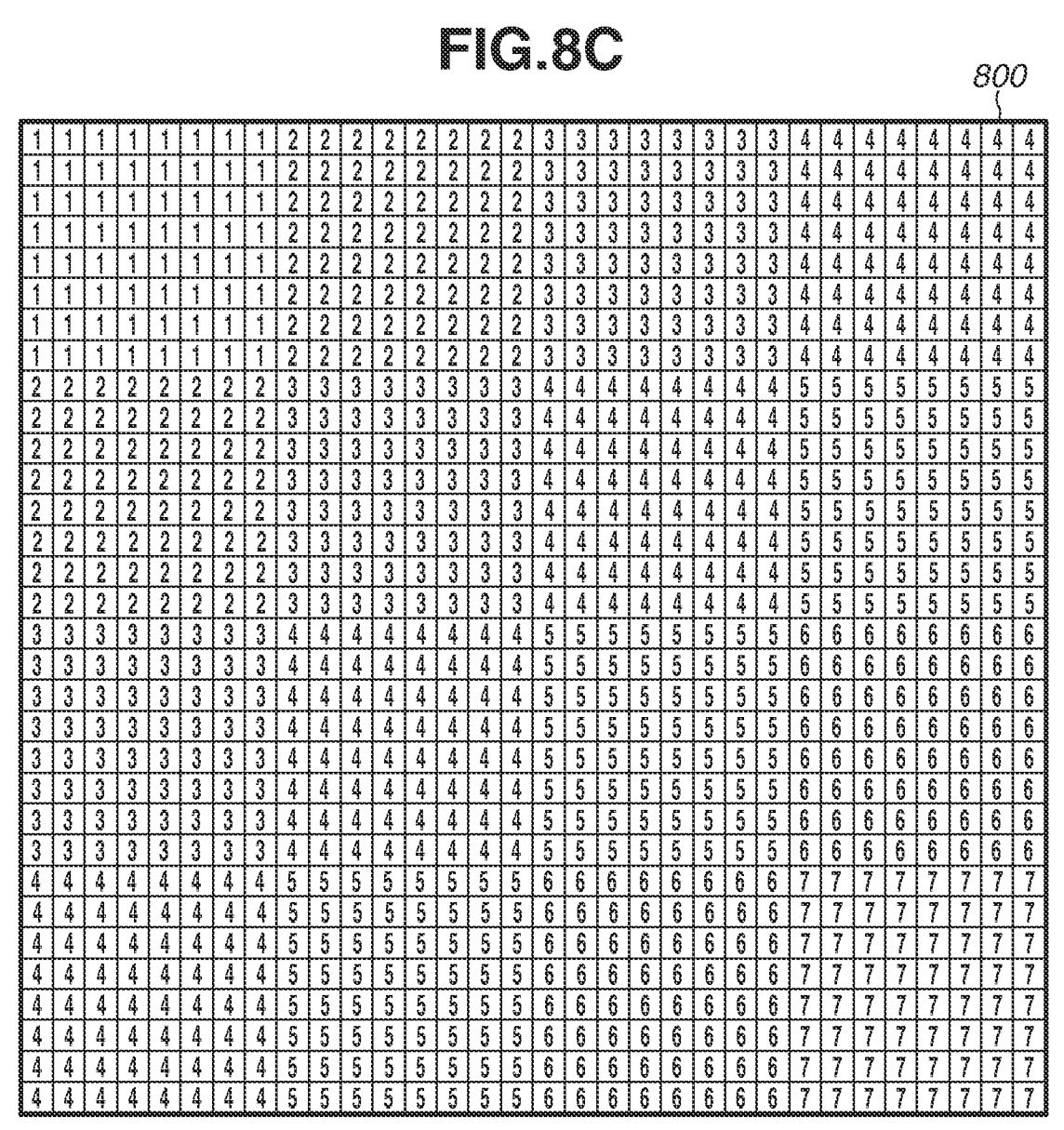

The method of generating a quantization matrix to be stored by the quantization matrix storage unit 103 is not limited to a particular method. For example, the user may input information indicating a quantization matrix, or the image encoding apparatus may calculate a quantization matrix based on the characteristics of an input image. Alternatively, a quantization matrix pre-specified as an initial value may be used. In addition to the base quantization matrix of the 8×8 array illustrated in FIG. 8A, in the present exemplary embodiment, two different types of two-dimensional quantization matrices of the 32×32 array illustrated in FIGS. 8B and 8C are generated by expanding the base quantization matrix, and then the generated two different quantization matrices are stored. The quantization matrix in FIG. 8B is a quantization matrix of the 32×32 array generated by quadrupling the base quantization matrix of the 8×8 array in FIG. 8A, i.e., by repeating each element thereof four times in the vertical and horizontal directions. On the other hand, the quantization matrix in FIG. 8C is a quantization matrix of the 32×32 array generated by expanding the top left 4×4 section of the base quantization matrix in FIG. 8A, i.e., by repeating each element thereof eight times in the vertical and horizontal directions.

As described above, the base quantization matrix is used not only to quantize the sub-block of the 8×8 array of pixels but also to generate a quantization matrix having a larger size than the base quantization matrix. While the size of the base quantization matrix used is the 8×8 array, the size is not limited thereto. Another base quantization matrix may be used in accordance with the size of sub-block. For example, when three different sub-blocks of 8×8, 16×16, and 32×32 arrays are used, three different base quantization matrices each corresponding to a different one of these sub-blocks are also applicable.

A prediction unit 104 determines sub-block division for image data in units of basic blocks. More specifically, the prediction unit 104 determines whether to divide a basic block into sub-blocks and, if division into sub-blocks is to be performed, determines how to divide the basic block. If division into sub-blocks is not performed, sub-blocks have the same size as that of the basic block. Sub-blocks may be squares or rectangles other than square (non-square).

The prediction unit 104 performs the intra prediction, which is the intra-frame prediction, the inter prediction, which is the inter-frame prediction, or the like in units of sub-blocks to generate prediction image data.

For example, the prediction unit 104 selects a prediction method to be performed on one sub-block from the intra prediction and the inter prediction, and performs the selected prediction to generate prediction image data for the sub-block. However, the prediction method to be used is not limited thereto but a prediction method combining the intra prediction and the inter prediction is also applicable.

The prediction unit 104 further calculates prediction residuals based on input image data and the prediction image data and outputs the prediction residuals. For example, the prediction unit 104 calculates the difference between each pixel value of a sub-block and each pixel value of the prediction image data generated by the prediction for the sub-block, and calculates the difference as prediction residuals.

The prediction unit 104 also outputs information necessary for the prediction, e.g., information indicating the sub-block division state, and information about the prediction mode indicating the prediction method for the sub-block and about the moving vector, together with the prediction residuals, etc. In the following descriptions, information necessary for the prediction is collectively referred to as prediction information.

The transform and quantization unit 105 orthogonally transforms the prediction residuals calculated by the prediction unit 104 in units of sub-blocks to acquire the orthogonal transform coefficients representing each frequency component of the prediction residuals. The transform and quantization unit 105 further quantizes the orthogonal transform coefficients by using the quantization matrix and the quantization parameter stored in the quantization matrix storage unit 103 to acquire quantized coefficients, which are quantized orthogonal transform coefficients. The function of orthogonal transform and the function of quantization may be separately configured.

An inverse quantization and inverse transform unit 106 inversely quantizes the quantized coefficients output from the transform and quantization unit 105, by using the quantization matrix and the quantization parameter stored in the quantization matrix storage unit 103, to reconstruct the orthogonal transform coefficients. Then, the inverse quantization and inverse transform unit 106 further performs the inverse orthogonal transform on the orthogonal transform coefficients to reconstruct the prediction residuals. Processing of reconstructing (deriving) orthogonal transform coefficients by using a quantization matrix and a quantization parameter is referred to as inverse quantization. The function of performing the inverse quantization and the function of performing the inverse quantization may be separately configured. Information used by the image decoding apparatus to derive a quantization parameter is encoded in bit streams by an encoding unit 110.

A frame memory 108 stores reconstructed image data.

An image reconstruction unit 107 generates prediction image data by referring to the frame memory 108 as appropriate based on the prediction information output from the prediction unit 104, generates reconstruction target image data based on the prediction image data and input prediction residuals, and outputs the reconstruction target image data.

An in-loop filter unit 109 performs the in-loop filter processing on the reconstruction target image, such as deblocking filter and sample adaptive offset, and outputs the filter-processed image.

The encoding unit 110 encodes the quantized coefficients output from the transform and quantization unit 105 and the prediction information output from the prediction unit 104 to generate code data, and outputs the code data.

A quantization matrix encoding unit 113 encodes the base quantization matrix output from the quantization matrix storage unit 103 to generate quantization matrix code data to be used for the image decoding apparatus to derive a base quantization matrix, and outputs the quantization matrix code data.

An integrated encoding unit 111 generates header code data by using the quantization matrix code data output from the quantization matrix encoding unit 113. The integrated encoding unit 111 further forms a bit stream together with the code data output from the encoding unit 110 and outputs the resultant.

A terminal 112 outputs the bit stream generated by the integrated encoding unit 111 to the outside.

The image encoding operation by the image encoding apparatus will be described below. In the configuration of the present exemplary embodiment, moving image data is input frame-by-frame. Although, in the description of the present exemplary embodiment, the block division unit 102 divides moving image data into a basic block of a 64×64 array of pixels, the present invention is not limited thereto. For example, a basic block of a 128×128 array of pixels may be used as the basic block or a basic block of a 32×32 array of pixels may be used as basic block.

Prior to image encoding, the image encoding apparatus generates and encodes a quantization matrix. In the following descriptions, the horizontal direction is referred to as X-coordinates, the vertical direction is referred to as y-coordinates, with the right direction of the horizontal direction and the downward direction of the vertical direction referred to as positive in, for example, the quantization matrix 800 and each block. The coordinate value of the top leftmost element of the quantization matrix 800 is (0, 0). More specifically, the coordinate value of the bottom rightmost element of the base quantization matrix of the 8×8 array is (7, 7). The coordinate value of the bottom rightmost element of the quantization matrix of the 32×32 array is (31, 31).

Firstly, the quantization matrix storage unit 103 generates a quantization matrix. A quantization matrix is generated in accordance with the size of sub-blocks, the size of orthogonal transform coefficients to be quantized, and the type of the prediction method. The present exemplary embodiment generates base quantization matrix of the 8×8 array (FIG. 8A) to be used to generate quantization matrices (described below). Then, the quantization matrix storage unit 103 extends this base quantization matrix to generate the two different quantization matrices of the 32×32 array illustrated in FIGS. 8B and 8C. The quantization matrix in FIG. 8B is a quantization matrix of the 32×32 array generated by quadrupling the base quantization matrix of the 8×8 array in FIG. 8A, i.e., by repeating each element thereof four times in the vertical and horizontal directions.

More specifically, in the example illustrated in FIG. 8B, the value of the top leftmost element of the base quantization matrix, 1, is assigned to each element in the range of x-coordinates of 0 to 3 and y-coordinates of 0 to 3 in the quantization matrix of the 32×32 array. The value of the bottom rightmost element of the base quantization matrix, 15, is assigned to each element in the range of x-coordinates of 28 to 31 and y-coordinates of 28 to 31 in the quantization matrix of the 32×32 array. In the example of FIG. 8B, the values of the elements in the base quantization matrix are each assigned to some of the elements in the quantization matrix of the 32×32 array.

On the other hand, the quantization matrix of FIG. 8C is a quantization matrix of the 32×32 array expanded by vertically and horizontally repeating each element in the top left 4×4 section of the base quantization matrix of FIG. 8A eight times.

More specifically, in the example illustrated in FIG. 8C, the value of the top leftmost element of the top left 4×4 section of the base quantization matrix, 1, is assigned to each element in the range of x-coordinates of 0 to 7 and y-coordinates of 0 to 7 in the quantization matrix of the 32×32 array. The value of the bottom rightmost element of the top left 4×4 section of the base quantization matrix, 7, is assigned to each element in the range of x-coordinates of 24 to 31 and y-coordinates of 24 to 31 in the quantization matrix of the 32×32 array. In the example of FIG. 8C, only the values of the elements corresponding to the top left 4×4 section (the range of x-coordinates of 0 to 3 and y-coordinates of 0 to 3) among the values of the elements in the base quantization matrix are assigned to the elements of the quantization matrix of the 32×32 array.

Note that the quantization matrices to be generated are not limited thereto. In a case where the orthogonal transform coefficients to be quantized have a size of other than 32×32 array, there may be generated a quantization matrix corresponding to the size of the orthogonal transform coefficients to be quantized, such as 16×16, 8×8, and 4×4 arrays. The method of determining each element configuring a base quantization matrix and a quantization matrix is not particularly limited. For example, predetermined initial values may be used or each element may be individually set. A quantization matrix may be generated according to the image characteristics.

The quantization matrix storage unit 103 stores the base quantization matrix and the quantization matrix generated in this way. FIGS. 8B and 8C illustrate examples of quantization matrices to be used for the quantization of orthogonal transform coefficients corresponding to the sub-blocks (described below) of the 32×32 array and the 64×64 array, respectively. A solid frame 800 represents a quantization matrix. To simplify the description, a quantization matrix 800 includes 1024 (32×32) pixels, and each square in the solid frame 800 represents each element configuring the quantization matrix 800. While, in the present exemplary embodiment, three different quantization matrices illustrated in FIGS. 8B and 8C are stored in a two-dimensional form, the form of elements in the quantization matrices is not limited thereto. A plurality of quantization matrices can be stored for the same prediction method according to the size of the orthogonal transform coefficients to be quantized or according to whether the encoding target is a luminance block or a chrominance block. Generally, to implement quantization processing conforming to the human visual characteristics, elements of the low-frequency portion corresponding to the top left portion of the quantization matrix have small values, and elements of the high-frequency portion corresponding to the lower right portion thereof have large values, as illustrated in FIGS. 8B and 8C.

The quantization matrix encoding unit 113 sequentially reads each element of the base quantization matrix stored in two-dimensional form from the quantization matrix storage unit 103, scans each element, calculates the difference, and disposes each difference in a one-dimensional array. According to the present exemplary embodiment, for the base quantization matrix illustrated in FIG. 8A, the difference from the immediately preceding element is calculated for each element in order of scanning by using the scanning method illustrated in FIG. 9. For example, the base quantization matrix of the 8×8 array illustrated in FIG. 8A is scanned through the scanning method illustrated in FIG. 9. After the first element 1 at the top leftmost is scanned, the element 2 positioned below the element 1 is scanned, and the difference +1 is calculated. To encode the first element of the quantization matrix (element 1 according to the present first exemplary embodiment), the difference from a predetermined initial value (e.g., 8) is calculated, the present invention is not limited thereto. The difference from a certain value or the value of the first element itself may be used.

Figure 9:
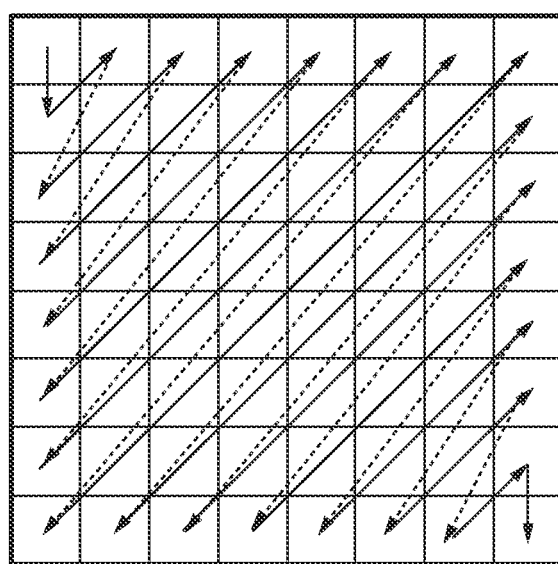
FIG. 9 is a diagram illustrating a method for scanning each element of the quantization matrix used in the first and the second exemplary embodiments.
Figure 10:
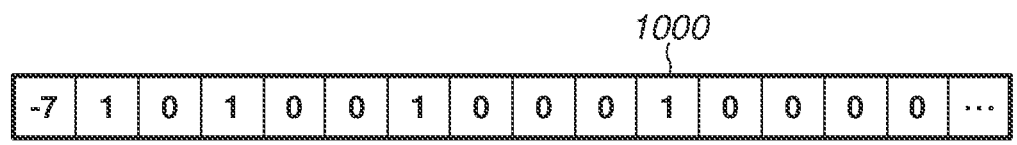
FIG. 10 is a diagram illustrating a differential value matrix of a quantization matrix generated in the first and the second exemplary embodiments.

In this way, the present exemplary embodiment generates the differential matrix illustrated in FIG. 10 by using the scanning method in FIG. 9 based on the base quantization matrix in FIG. 8A. The quantization matrix encoding unit 113 further encodes the differential matrix to generate quantization matrix code data. While, in the present exemplary embodiment, the quantization matrix encoding unit 113 performs encoding by using the coding table illustrated in FIG. 11A, the coding table is not limited thereto but the encoding table illustrated in FIG. 11B may be used. The quantization matrix code data generated in this way is output to the integrated encoding unit 111 in the subsequent stage.

Referring back to FIG. 1, the integrated encoding unit 111 encodes header information necessary for image data encoding and integrates the code data of the quantization matrix with the encoded header information.

Subsequently, the integrated encoding unit 111 encodes image data. The image data for one frame input from the terminal 101 is input to the block division unit 102.

The block division unit 102 divides the input image data into a plurality of basic blocks and then outputs the image in units of basic blocks to the prediction unit 104. According to the present exemplary embodiment, the block division unit 102 outputs image in units of basic blocks of a 64×64 array of pixels.

Figure 7A:
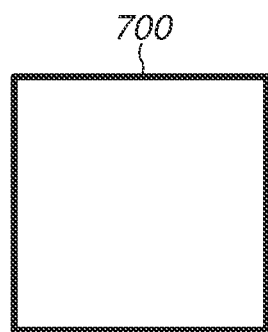
FIG. 7A is a diagram illustrating an example of sub-block division used in the first and the second exemplary embodiments.
Figure 7B:
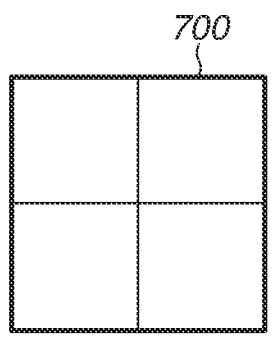
FIG. 7B is a diagram illustrating an example of sub-block division used in the first and the second exemplary embodiments.
Figure 7C:
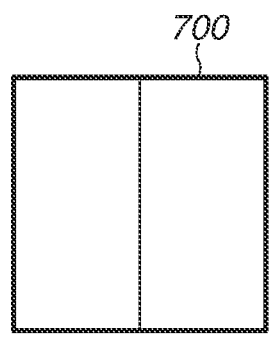
FIG. 7C is a diagram illustrating an example of sub-block division used in the first and the second exemplary embodiments.
Figure 7D:
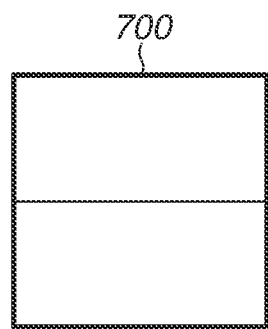
FIG. 7D is a diagram illustrating an example of sub-block division used in the first and the second exemplary embodiments.
Figure 7E:
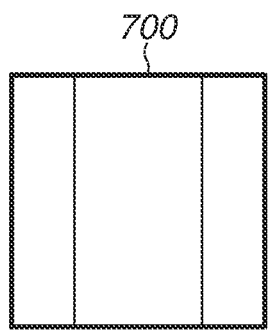
FIG. 7E is a diagram illustrating an example of sub-block division used in the first and the second exemplary embodiments.
Figure 7F:
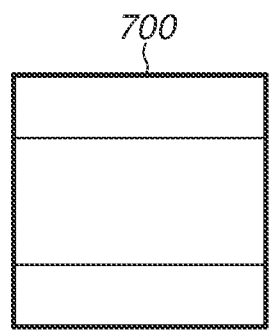
FIG. 7F is a diagram illustrating an example of sub-block division used in the first and the second exemplary embodiments.

FIG. 7A to 7F illustrate examples of sub-block division methods. A solid frame 700 represents a basic block. The basic sub-block 700 has the 64×64 array of pixels and each square in the solid frame 700 represents each sub-block for the sake of simplifying the explanation. FIG. 7B illustrates an example of square sub-block division of a quad-tree. A basic block of the 64×64 array of pixels is divided into sub-blocks of a 32×32 array of pixels. FIGS. 7C to 7F illustrate examples of rectangular sub-block division. Referring to FIG. 7C, the basic block is divided into vertically long rectangular sub-blocks of a 32×64 array of pixels. Referring to FIG. 7D, the basic block is divided into horizontally long rectangular sub-blocks of a 64×32 array of pixels. Referring to FIGS. 7E and 7F, the basic block is divided into different rectangular sub-blocks at a ratio of 1:2:1. In this way, the block division unit 102 performs encoding processing by using not only square sub-blocks but also non-square rectangular sub-blocks. The basic block may be further divided into a plurality of square blocks and then these division square blocks may be divided into sub-blocks. In other words, the size of the basic block is not limited to the 64×64 array of pixels, and a basic block having a plurality of sizes may be used.

While, in the present exemplary embodiment, only the basic block of the 64×64 array of pixels which is not divided as illustrated in FIG. 7A and quad-tree division as illustrated in FIG. 7B are used, the sub-block division method is not limited thereto. Trinary-tree division as illustrated in FIGS. 7E and 7F, or binary-tree division as illustrated in FIG. 7C and FIG. 7D may be used. In a case where sub-block division other than the divisions in FIGS. 7A and 7B is used, a quantization matrix corresponding to the sub-block to be used by the quantization matrix storage unit 103 is generated. In a case where also a new base quantization matrix corresponding to the generated quantization matrix is generated, the new base quantization matrix will be encoded by the quantization matrix encoding unit 113.

The prediction method by the prediction unit 104 according to the present exemplary embodiment will be described in more detail below. As an example, the present exemplary embodiment uses two different prediction methods, the intra prediction and the inter prediction. In the intra prediction method, prediction pixels of the encoding target block are generated by using an encoded image positioned spatially around the encoding target block, and also intra prediction mode information is generated that indicates the intra prediction method that is used out of intra prediction methods including horizontal prediction, vertical prediction, and DC prediction. In the inter prediction method, predicted pixels of the encoding target block are generated by using an encoded image of a frame temporally different from the encoding target block, and also moving information is generated that indicates a frame to be referred or moving vector. As described above, the prediction unit 194 may use a prediction method that combines the intra prediction and the inter prediction.

The prediction unit 104 generates prediction image data based on the determined prediction mode and an encoded image, generates prediction residuals from the input image data and the prediction image data, and outputs the prediction residuals to the transform and quantization unit 105. Information such as the sub-block division and the prediction mode is output as prediction information to the encoding unit 110 and the image reconstruction unit 107.

The transform and quantization unit 105 performs the orthogonal transform and quantization on the input prediction residuals to generate quantized coefficients. The transform and quantization unit 105 initially performs the orthogonal transform processing on the prediction residuals in accordance with the size of the sub-block to generate orthogonal transform coefficients, and then quantizes the generated orthogonal transform coefficients in accordance with the prediction mode by using the quantization matrix stored in the quantization matrix storage unit 103 to generate quantized coefficients. The orthogonal transform and quantization processing will be described in more detail below.

In a case where the 32×32 sub-block division illustrated in FIG. 7B is selected, the transform and quantization unit 105 orthogonally transforms the 32×32 array of prediction residuals using the 32×32 orthogonal transform matrix to generate a 32×32 array of orthogonal transform coefficients. More specifically, the transform and quantization unit 105 performs the multiplication of the orthogonal transform matrix of the 32×32 array represented by the discrete cosine transform (DCT) and the 32×32 array of prediction residuals to calculate intermediate coefficients in a 32×32 array. The transform and quantization unit 105 further performs the multiplication of the intermediate coefficients in the 32×32 array and the transposed matrix of the foregoing orthogonal transform matrix of the 32×32 array to generate a 32×32 array of orthogonal transform coefficients. The transform and quantization unit 105 quantizes the 32×32 array of the orthogonal transform coefficients thus generated by using the quantization matrix of the 32×32 array illustrated in FIG. 8B and the quantization parameter to generate a 32×32 array of quantized coefficients. Since the basic block of the 64×64 array includes four sub-blocks of the 32×32 array, the transform and quantization unit 105 repeats the above-described processing four times.

In a case where the 64×64 division state illustrated in FIG. 7A (no division) is selected, the orthogonal transform matrix of 64×32 array generated by thinning out rows of odd numbers (hereinafter referred to as odd number rows) in the orthogonal transform matrix of 64×64 array and is used for the 64×64 array of prediction residuals. More specifically, the transform and quantization unit 105 orthogonally transforms the prediction residuals using the orthogonal transform matrix of the 64×32 array generated by thinning out odd number rows, to generate the 32×32 array of orthogonal transform coefficients.

More specifically, the transform and quantization unit 105 firstly generates an orthogonal transform matrix of a 64×32 array by thinning out odd number rows from the orthogonal transform matrix of the 64×64 array. Then, the transform and quantization unit 105 performs the multiplication of the orthogonal transform matrix of the 64×32 array and the 64×64 array of prediction residuals to generate intermediate coefficients in a 64×32 array. The transform and quantization unit 105 performs the multiplication of the intermediate coefficients in the 64×32 array and the transposed matrix of a 32×64 generated by transposing the above-described orthogonal transform matrix of the 64×32 array to generate a 32×32 array of orthogonal transform coefficients. Then, the transform and quantization unit 105 performs the zeroing out by setting the generated 32×32 array of orthogonal transform coefficients to the coefficients of the upper left section (the range of x-coordinates of 0 to 31 and y-coordinates of 0 to 31) of the 64×64 array of orthogonal transform coefficients, and setting other sections to 0.

In this way, in the present exemplary embodiment, the orthogonal transform is performed on the 64×64 array of prediction residuals by using the orthogonal transform matrix of the 64×32 array and the transposed matrix of the 32×64 array generated by transposing the orthogonal transform matrix of the 64×32 array. The transform and quantization unit 105 performs the zeroing out by generating the 32×32 array of orthogonal transform coefficients in this way. This enables the generation of the 32×32 array of orthogonal transform coefficients with less calculation amount than the method of forcibly setting some of the orthogonal transform coefficients in the 64×64 array generated through the 64×64 orthogonal transform, to 0 even if the values thereof are not 0. More specifically, the calculation amount in the orthogonal transform can be reduced in comparison with a case of performing the orthogonal transform by using the orthogonal transform matrix of the 64×64 array and then encoding the resultant orthogonal transform coefficients to be subjected to the zeroing out with the coefficients regarded as 0 regardless of whether they are 0. Although the use of the method of calculating the 32×32 array of orthogonal transform coefficients based on the orthogonal transform coefficients from the 64×64 array of prediction residuals can reduce the calculation amount, the zeroing out method is not limited thereto but various methods are also applicable.

In a case where the zeroing out is performed, encoding may be performed on information indicating that the orthogonal transform coefficients in the zeroing out target range are 0 or on information simply indicating that the zeroing out has been performed (such as a flag). By decoding these pieces of information, the image decoding apparatus can decode each block with the zeroing out target regarded as 0.

Then, the transform and quantization unit 105 quantizes the 32×32 array of orthogonal transform coefficients thus generated, by using the quantization matrix of the 32×32 array illustrated in FIG. 8C and the quantization parameter, to generate a 32×32 array of quantized coefficients.

In the present exemplary embodiment, the quantization matrix in FIG. 8B is used for the 32×32 array of orthogonal transform coefficients corresponding to the sub-block of the 32×32 array, and the quantization matrix in FIG. 8C is used for the 32×32 array of orthogonal transform coefficients corresponding to the sub-block of the 64×64 array. More specifically, the quantization matrix in FIG. 8B is used for the 32×32 array of orthogonal transform coefficients on which the zeroing out has not been performed, and the quantization matrix in FIG. 8C is used for the 32×32 array of orthogonal transform coefficients that have been subjected to the zeroing out and correspond to the sub-block of the 64×64 array. However, the quantization matrices to be used are not limited thereto. The generated quantized coefficients are output to the encoding unit 110 and the inverse quantization and inverse transform unit 106.

The inverse quantization and inverse transform unit 106 inversely quantizes the input quantized coefficients by using the quantization matrix stored in the quantization matrix storage unit 103 and the quantization parameter, to reconstruct the orthogonal transform coefficients. The inverse quantization and inverse transform unit 106 then further performs the inverse orthogonal transform on the reconstructed orthogonal transform coefficients, to reconstruct the prediction residuals. As in the transform and quantization unit 105, the quantization matrix corresponding to the size of the encoding target sub-blocks is used for the inverse quantization processing. The inverse quantization and inverse orthogonal transform processing by the inverse quantization and inverse transform unit 106 will be described in more detail below.

In a case where the 32×32 sub-block division illustrated in FIG. 7B is selected, the inverse quantization and inverse transform unit 106 inversely quantizes the 32×32 array of quantized coefficients generated by the transform and quantization unit 105, by using the quantization matrix in FIG. 8B, to reconstruct the 32×32 array of orthogonal transform coefficients. The inverse quantization and inverse transform unit 106 then performs the multiplication of the foregoing transposed matrix of the 32×32 array and the orthogonal transform coefficients of the 32×32 array to calculate intermediate coefficients in a 32×32 array. The inverse quantization and inverse transform unit 106 then performs the multiplication of the intermediate coefficients in the 32×32 array and the foregoing orthogonal transform matrix of 32×32 array to reconstruct the 32×32 array of prediction residuals. The inverse quantization and inverse transform unit 106 subjects each of the sub-blocks of the 32×32 array to similar processing. On the other hand, in a case where no division is selected as illustrated in FIG. 7A, the inverse quantization and inverse transform unit 106 inversely quantizes the 32×32 array of quantized coefficients generated by the transform and quantization unit 105, by using the quantization matrix in FIG. 8C, to reconstruct the 32×32 array of orthogonal transform coefficients. Subsequently, the inverse quantization and inverse transform unit 106 performs the multiplication of the transposed matrix of the 32×64 array and the orthogonal transform coefficients of the 32×32 array to calculate intermediate coefficients in a 32×64 array. The inverse quantization and inverse transform unit 106 performs the multiplication of these intermediate coefficients in the 32×64 array and the orthogonal transform matrix of the 64×32 array to reconstruct the 64×64 array of prediction residuals. The present exemplary embodiment performs the inverse quantization processing by using the quantization matrix same as the one used by the transform and quantization unit 105 in accordance with the size of sub-blocks. The reconstructed prediction residuals are output to the image reconstruction unit 107.

The image reconstruction unit 107 refers to the data required for the reconstruction of the prediction image stored in the frame memory 108 as appropriate and reconstructs the prediction image based on the prediction information input from the prediction unit 104. The image reconstruction unit 107 then reconstructs image data from the reconstructed prediction image and the reconstructed prediction residuals input from the inverse quantization and inverse transform unit 106, and inputs and stores the image data in the frame memory 108.

The in-loop filter unit 109 reads the reconstruction target image from the frame memory 108 and performs in-loop filter processing such as deblocking filtering. The in-loop filter unit 109 then inputs the filter-processed image and stores the image in the frame memory 108 again.

The encoding unit 110 performs entropy encoding on, in units of blocks, the quantized coefficients generated by the transform and quantization unit 105 and the prediction information input from the prediction unit 104 to generate code data. Although the entropy encoding method is not particularly specified, Golomb coding, arithmetic coding, and Huffman coding can be used. The generated code data is output to the integrated encoding unit 111.

The integrated encoding unit 111 multiplexes the code data input from the encoding unit 110, together with the header code data described above, to form a bit stream. Eventually, the bit stream is output to the outside via the terminal 112.

Figure 6A:
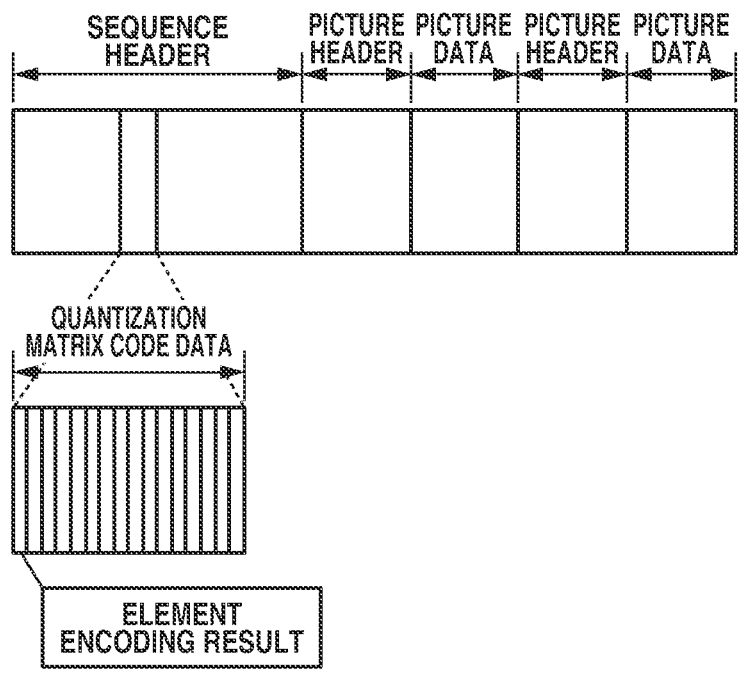
FIG. 6A is a diagram illustrating an example of a bit stream to be output according to the first exemplary embodiment.

FIG. 6A illustrates an example of a bit stream to be output in the first exemplary embodiment. A sequence header includes the code data for the base quantization matrix, which includes results of the encoding of each element. Note that the location where the code data on the base quantization matrix and the like are encoded is not limited thereto, and it will be understood that the bit stream may be configured so that such data is encoded in a picture header section or other header sections. If quantization matrices are switched within a sequence, a new base quantization matrix can be encoded for update. In such a case, all the quantization matrices may be rewritten, or some of the quantization matrices may be changed by specifying the sub-block size of the quantization matrix corresponding to the quantization matrix to be rewritten.

Figure 3:
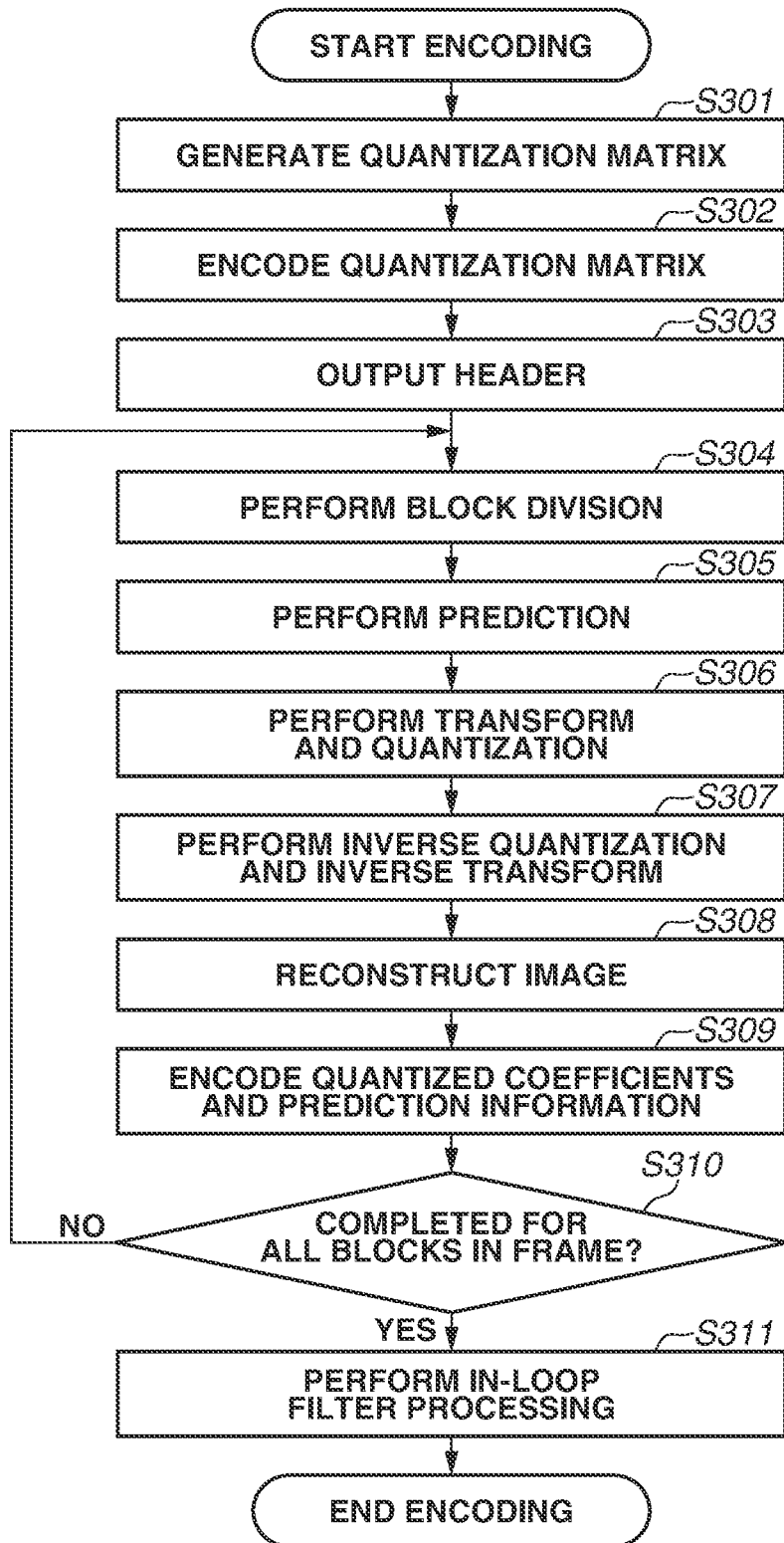
FIG. 3 is a flowchart illustrating image encoding processing in the image encoding apparatus according to the first exemplary embodiment.

FIG. 3 is a flowchart illustrating encoding processing by the image encoding apparatus according to the first exemplary embodiment.

In step S301, prior to image encoding, the quantization matrix storage unit 103 generates and stores the two-dimensional quantization matrices. In the present exemplary embodiment, the quantization matrix storage unit 103 generates the base quantization matrix illustrated in FIG. 8A and the quantization matrices illustrated in FIGS. 8B and 8C from the base quantization matrix, and stores the base quantization matrix and the quantization matrices.

In step S302, the quantization matrix encoding unit 113 scans the base quantization matrix used to generate the quantization matrices in step S301 and calculates the difference between elements adjoining in the scan order, to generate a one-dimensional differential matrix. According to the present exemplary embodiment, for the base quantization matrix in FIG. 8A, the differential matrix illustrated in FIG. 10 is generated by using the scanning method in FIG. 9. The quantization matrix encoding unit 113 further encodes the generated differential matrix to generate quantization matrix code data.

In step S303, the integrated encoding unit 111 encodes and outputs header information necessary for image data encoding, together with the generated quantization matrix code data.

In step S304, the block division unit 102 divides a frame-by-frame input image in units of the basic blocks of a 64×64 array of pixels.

In step S305, the prediction unit 104 generates prediction information, such as sub-block division information and the prediction mode, and prediction image data by performing prediction processing on the image data in units of basic blocks generated in step S304, using the foregoing prediction method. In the present exemplary embodiment, two types of block sizes, namely, that of a sub-block of the 32×32 array of pixels illustrated in FIG. 7B and that of a sub-block of the 64×64 array of pixels illustrated in FIG. 7A are used. The prediction unit 104 further calculates prediction residuals from the input image data and the prediction image data.

In step S306, the transform and quantization unit 105 orthogonally transforms the prediction residuals calculated in step S305 to generate orthogonal transform coefficients. The transform and quantization unit 105 then further generates quantized coefficients by quantizing the orthogonal transform coefficients by using the quantization matrices generated and stored in step S301 and the quantization parameter. More specifically, the transform and quantization unit 105 performs the multiplication of the prediction residuals in the sub-block of the 32×32 array of pixels in FIG. 7B and the orthogonal transform matrix of the 32×32 array and the transposed matrix thereof to generate a 32×32 array of orthogonal transform coefficients. On the other hand, the transform and quantization unit 105 performs the multiplication of the prediction residuals in the sub-block of the 64×64 array of pixels in FIG. 7A and the orthogonal transform matrix of the 64×32 array and the transposed matrix thereof to generate a 32×32 array of orthogonal transform coefficients. In the present exemplary embodiment, the transform and quantization unit 105 quantizes the 32×32 array of orthogonal transform coefficients by using the quantization matrix in FIG. 8B for the orthogonal transform coefficients in the sub-block of the 32×32 array in FIG. 7B, and by using the quantization matrix in FIG. 8C for the orthogonal transform coefficients corresponding to the sub-block of the 64×64 array in FIG. 7A.

In step S307, the inverse quantization and inverse transform unit 106 inversely quantizes the quantized coefficients generated in step S306 by using the quantization matrices generated and stored in step S301 and the quantization parameter, to reconstruct the orthogonal transform coefficients. Further, the inverse quantization and inverse transform unit 106 performs the inverse orthogonal transform on the orthogonal transform coefficients to reconstruct the prediction residuals. In this step, the inverse quantization and inverse transform unit 106 performs the inverse quantization processing by using the same quantization matrices as those used in step S306. More specifically, the inverse quantization and inverse transform unit 106 performs the inverse quantization processing on the 32×32 array of quantized coefficients corresponding to the sub-block of the 32×32 array of pixels in FIG. 7B by using the quantization matrix in FIG. 8B to reconstruct the 32×32 array of orthogonal transform coefficients. The inverse quantization and inverse transform unit 106 then performs the multiplication of the 32×32 array of orthogonal transform coefficients by using the orthogonal transform matrix of the 32×32 array and the transposed matrix thereof to reconstruct the 32×32 array of pixels of prediction residuals. On the other hand, the inverse quantization and inverse transform unit 106 performs the inverse quantization processing on the 32×32 array of quantized coefficients corresponding to the pixel sub-block of the 64×64 array in FIG. 7A to the inverse quantization processing by using the quantization matrix in FIG. 8C to reconstruct the 32×32 array of orthogonal transform coefficients. The inverse quantization and inverse transform unit 106 then performs the multiplication of the 32×32 array of orthogonal transform coefficients and the orthogonal transform matrix of the 64×32 array and the transposed matrix thereof to reconstruct the 64×64 array of pixels of prediction residuals.

In step S308, the image reconstruction unit 107 reconstructs the prediction image based on the prediction information generated in step S305. The image reconstruction unit 107 further reconstructs the image data from the reconstructed prediction image and the prediction residuals generated in step S307.

In step S309, the encoding unit 110 encodes the prediction information generated in step S305 and the quantized coefficients generated in step S306 to generate code data. The encoding unit 110 generates a bit stream including other code data as well.

In step S310, the image encoding apparatus determines whether the encoding is completed for all the basic blocks in the frame. If encoding is completed (YES in step S310), the processing proceeds to step S311. On the other hand, if encoding is not completed (NO in step S310), the processing returns to step S304 with the next basic block as a target.

In step S311, the in-loop filter unit 109 performs the in-loop filter processing on the image data reconstructed in step S308 to generate a filter-processed image. Then, the processing ends.

By the above-described configuration and operation, quantization of each frequency component can be controlled to improve subjective image quality while reducing the amount of computation. In particular, the quantization of each frequency component can be controlled to improve subjective image quality while reducing the amount of computation by reducing the number of orthogonal transform coefficients and performing the quantization processing using a quantization matrix corresponding to the reduced orthogonal transform coefficients in step S306. Moreover, in a case where the number of orthogonal transform coefficients is reduced to quantize and encode only a low frequency section, quantization control optimum to the low frequency section can be implemented by using a quantization matrix obtained by expanding only the low frequency section of the base quantization matrix as in FIG. 8C. In the example of FIG. 8C, the low frequency section here refers to the range of x-coordinates of 0 to 3 and y-coordinates of 0 to 3.

In the configuration according to the present exemplary embodiment, to reduce the amount of code, only the base quantization matrix of FIG. 8A that is commonly used in generating the quantization matrices of FIGS. 8B and 8C are encoded. Alternatively, the quantization matrices of FIGS. 8B and 8C themselves may be encoded. This enables finer quantization control on each frequency component since distinctive values can be set for the respective frequency components of the quantization matrices. Alternatively, respective different base quantization matrices may be set for the quantization matrices FIGS. 8B and 8C, and the respective base quantization matrices may be encoded, as another configuration. In such a case, it is possible to implement more elaborate control of subjective image quality, by performing respective different quantization controls on the 32×32 array of orthogonal transform coefficients and the 64×64 array of orthogonal transform coefficients. Moreover, in such a case, the quantization matrix corresponding to the 64×64 array of orthogonal transform coefficients may be obtained by quadrupling the entire base quantization matrix of the 8×8 array instead of octupling the top left 4×4 section of the base quantization matrix of the 8×8 array. This enables finer quantization control on the 64×64 array of orthogonal transform coefficients as well.

Figure 6B:
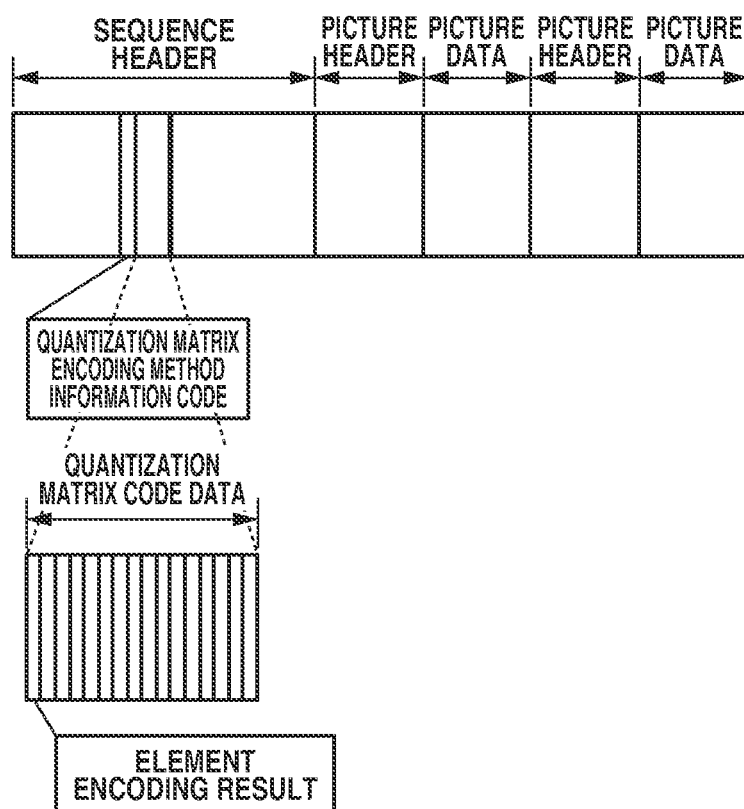
FIG. 6B is a diagram illustrating an example of a bit stream to be output according to the first exemplary embodiment.

Moreover, while, in the configuration according to the present exemplary embodiment, the quantization matrix for a sub-block of the 64×6 4 array with zeroing out used is uniquely determined, an identifier may be introduced to enable selection. For example, FIG. 6B illustrates a bit stream where a quantization matrix encoding method information code is newly introduced to make the quantization matrix encoding of a sub-block of the 64×6 4 array having been zeroed out selective. For example, in a case where the quantization matrix encoding method information code indicates 0, FIG. 8C that is an independent quantization matrix is used for the orthogonal transform coefficients corresponding to the sub-block of the 64×6 4 array of pixels with zeroing out used. In a case where the encoding method information code indicates 1, FIG. 8B that is a quantization matrix for an ordinary sub-block to not be zeroed out is used for the sub-block of the 64×6 4 array of pixels with zeroing out used. In a case where the encoding method information code indicates 2, all the elements of the quantization matrix to be used for the sub-block of the 64×6 4 array of pixels with zeroing out used are encoded instead of those of the base quantization matrix of the 8×8 array. This can implement a reduction in the amount of quantization matrix code and independent quantization control on a sub-block with zeroing out used in a selective manner.

Figure 12B:
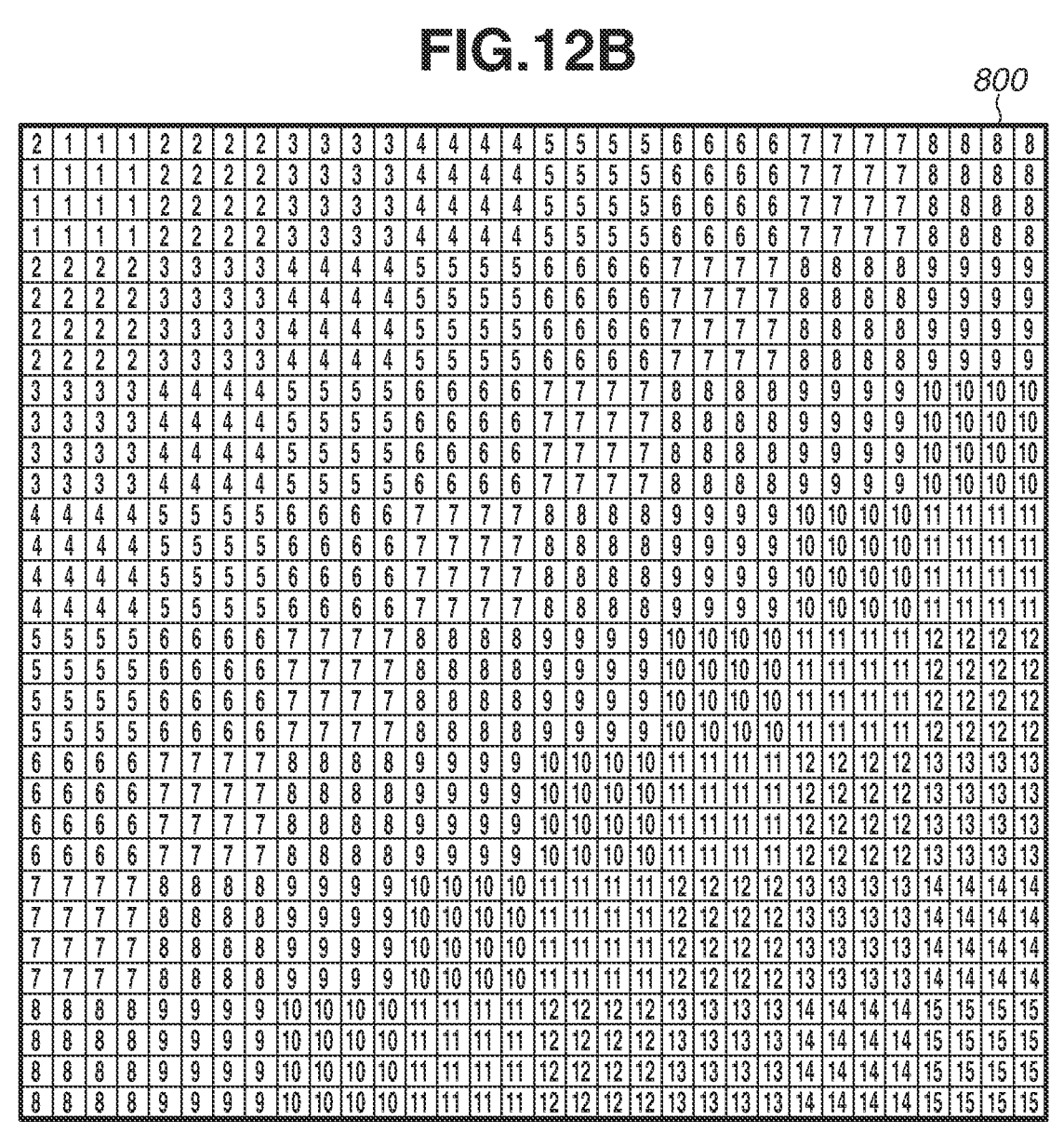

In the present exemplary embodiment, the sub-blocks processed by zeroing out are only those of the 64×64 array. However, the sub-blocks to be processed by zeroing out are not limited thereto. For example, among the orthogonal transform coefficients corresponding to a sub-blocks of a 32×64 or 64×32 array illustrated in FIG. 7C or 7D, the 32×32 orthogonal transform coefficients in the lower half or right half may be forcefully set to 0. In such a case, only the 32×32 array of orthogonal transform coefficients in the upper half or left half are quantized and encoded. The quantization processing on the 32×32 array of orthogonal transform coefficients in the upper half or left half is performed by using a quantization matrix different from that of FIG. 8B. Moreover, the configuration may be made such that the values of the respective quantization matrices cor- responding to DC coefficient at the top left of the generated orthogonal transform coefficients, which presumably have the greatest impact on image quality, are set and encoded separately from the values of the elements of the base quantization matrix of the 8×8 array. FIGS. 12B and 12C illustrate examples where the value of the top leftmost element corresponding to the DC component is changed from the quantization matrices in FIGS. 8B and 8C. In such a case, the quantization matrices illustrated in FIGS. 12B and 12C can be set by additionally encoding information indicating "2" at the position of the DC part in addition to the information about the base quantization matrix of FIG. 8A. This enables finer quantization control on the DC component of the orthogonal transform coefficient having the greatest impact on image quality.

Second Exemplary Embodiment

Figure 2:
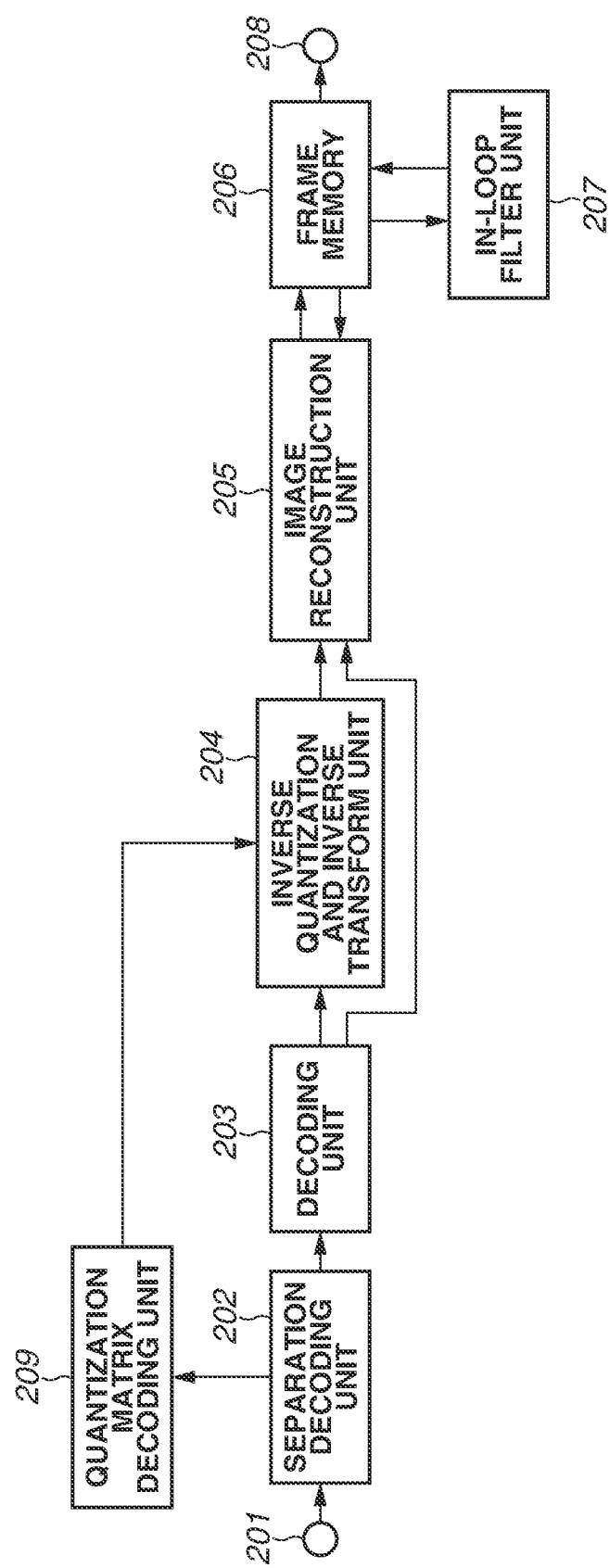
FIG. 2 is a block diagram illustrating a configuration of an image encoding apparatus according to a second exemplary embodiment.

FIG. 2 is a block diagram illustrating a configuration of an image decoding apparatus according to a second exemplary embodiment of the present invention. In the second exemplary embodiment, an image decoding apparatus that decodes the code data generated in the first exemplary embodiment will be described below as an example.

A terminal 201 is used to input an encoded bit stream.

A separation decoding unit 202 separates information related to the decoding processing and the code data related to coefficients from the bit stream and decodes the code data included in the header section of the bit stream. In the present exemplary embodiment, the quantization matrix code is separated and the quantization matrix code is output to the subsequent stage. The separation decoding unit 202 performs the reverse operation of the integrated encoding unit 111 in FIG. 1.

A quantization matrix decoding unit 209 decodes the quantization matrix code from the bit stream to reconstruct the base quantization matrix, and further performs processing of generating quantization matrices from the base quantization matrix.

A decoding unit 203 decodes the code data output from the separation decoding unit 202 to reconstruct (derive) the quantized coefficients and the prediction information.

An inverse quantization and inverse transform unit 204 performs inverse quantization on the quantized coefficients by using the reconstructed quantization matrix and the quantization parameter to acquire the orthogonal transform coefficients, and further performs inverse orthogonal transform on the orthogonal transform coefficients to reconstruct the prediction residuals, as in the inverse quantization and inverse transform unit 106 in FIG. 1. Information for deriving the quantization parameter is also decoded from the bit stream by the decoding unit 203. The function of performing the inverse quantization and the function of performing the inverse quantization may be separately configured.

A frame memory 206 stores image data about a reconstructed picture.

An image reconstruction unit 205 generates prediction image data by referring to the frame memory 206 as appropriate based on the input prediction information. The image reconstruction unit 205 then generates reconstruction target image data from the prediction image data and the prediction residuals reconstructed by the inverse quantization and inverse transform unit 204, and outputs the reconstruction target image data.

An in-loop filter unit 207 performs the in-loop filter processing, such as deblocking filtering, on the reconstruction target image and outputs the filter-processed image, as in 109 in FIG. 1.

A terminal 208 outputs the reconstructed image data to the outside.

The image decoding operation by the image decoding apparatus will be described below. In the configuration according to the present exemplary embodiment, the bit stream generated in the first exemplary embodiment is input frame by frame (picture by picture).

Referring to FIG. 2, the bit stream for one frame input from the terminal 201 is input to the separation decoding unit 202. The separation decoding unit 202 separates information related to the decoding processing and the code data related to coefficients from the bit stream, and decodes the code data included in the header section of the bit stream. More specifically, the separation decoding unit 202 reconstructs the quantization matrix code data. In the present exemplary embodiment, the quantization matrix code data is extracted from the sequence header of the bit stream illustrated in FIG. 6A, and the quantization matrix code data is output to the quantization matrix decoding unit 209. In the present exemplary embodiment, the quantization matrix code data corresponding to the base quantization matrix illustrated in FIG. 8A is extracted, and the quantization matrix code data is output. Subsequently, the code data in units of basic blocks of the picture data is reconstructed, and the code data is output to the decoding unit 203.

The quantization matrix decoding unit 209 initially decodes the input quantization matrix code data to reconstruct the one-dimensional differential matrix illustrated in FIG. 10. While, in the present exemplary embodiment, quantization matrix decoding unit 209 performs the decoding by using the coding table illustrated in FIG. 11A, the coding table is not limited thereto, as in the first exemplary embodiment. Any other coding tables that are the same as those in the first exemplary embodiment may be used. Further, the quantization matrix decoding unit 209 reconstructs the two-dimensional quantization matrix from the reconstructed one-dimensional differential matrix. Here, the quantization matrix decoding unit 209 performs operation reverse to the operation of the quantization matrix encoding unit 113 according to the first exemplary embodiment. More specifically, in the present exemplary embodiment, the base quantization matrix illustrated in FIG. 8A is reconstructed from the difference matrix illustrated in FIG. 10 by using the scanning method illustrated in FIG. 9, and the reconstructed base quantization matrix is stored respectively. More specifically, the quantization matrix decoding unit 209 reconstructs each element of the quantization matrix by sequentially adding each differential value in the differential matrix to the above-described initial value. The quantization matrix decoding unit 209 then reconstructs the two-dimensional quantization matrix by sequentially associating each of the reconstructed one-dimensional elements with the corresponding element of the two-dimensional quantization matrix according to the scanning method illustrated in FIG. 9.

Further, the quantization matrix decoding unit 209 expands the reconstructed base quantization matrix, as in the first exemplary embodiment, to generate the two types of quantization matrices of the 32×32 array illustrated in FIGS. 8B and 8C. The quantization matrix in FIG. 8B is a quantization matrix of the 32×32 array generated by quadrupling the base quantization matrix of the 8×8 array in FIG. 8A, i.e., by repeating each element thereof four times in the vertical and horizontal directions.

By contrast, the quantization matrix in FIG. 8C is a quantization matrix of the 32×32 array generated by expanding the top left 4×4 section of the base quantization matrix in FIG. 8A, i.e., by repeating each element thereof eight times in the vertical and horizontal directions. However, the generated quantization matrix is not limited thereto. If there is any other size of the quantized coefficients to be inversely quantized in a subsequent stage than 32×32 array, a quantization matrix corresponding to the size of the quantized coefficients to be inversely quantized, such as 16×16, 8×8, and 4×4 arrays, may be generated. These generated quantization matrices are stored and used for the inverse quantization processing in the subsequent stage.

The decoding unit 203 decodes the code data from the bit stream to reconstruct the quantized coefficients and the prediction information. The decoding unit 203 determines the size of the decoding target sub-block based on the decoded prediction information, outputs the reconstructed quantized coefficients to the inverse quantization and inverse transform unit 204, and outputs the reconstructed prediction information to the image reconstruction unit 205. According to the present exemplary embodiment, the 32×32 array of quantized coefficients are reconstructed for each sub-block regardless of the size of the decoding target sub-block, i.e., whether the size is the 64×64 array as in FIG. 7A or the 32×32 array as in FIG. 7B.

The inverse quantization and inverse transform unit 204 performs the inverse quantization on the input quantized coefficients by using the quantization matrix reconstructed by the quantization matrix decoding unit 209 and the quantization parameter to generate orthogonal transform coefficients, and further performs the inverse orthogonal transform on the orthogonal transform coefficients to reconstruct the prediction residuals. The inverse quantization and inverse orthogonal transform processing will be described in more detail below.

In a case where the 32×32 sub-block division as in FIG. 7B is selected, the inverse quantization and inverse transform unit 204 inversely quantizes the 32×32 array of quantized coefficients reconstructed by the decoding unit 203 by using the quantization matrix in FIG. 8B to reconstruct the 32×32 array of orthogonal transform coefficients. Then, the inverse quantization and inverse transform unit 204 performs the multiplication of the transposed matrix of the 32×32 array and the orthogonal transform coefficients of the 32×32 array to calculate intermediate coefficients in 32×32 array. The inverse quantization and inverse transform unit 204 performs the multiplication of the intermediate coefficients in the 32×32 array and the foregoing 32×32 orthogonal transform matrix to reconstruct the 32×32 array of prediction residuals. The inverse quantization and inverse transform unit 204 performs similar processing on each of the sub-blocks of the 32×32 array.

On the other hand, in a case where no division is selected as illustrated in FIG. 7A, the inverse quantization and inverse transform unit 204 inversely quantizes the 32×32 array of quantized coefficients reconstructed by the decoding unit 203, by using the quantization matrix in FIG. 8C, to reconstruct the 32×32 array of orthogonal transform coefficients. The inverse quantization and inverse transform unit 204 then performs the multiplication of the transposed matrix of the 32×64 array and the orthogonal transform coefficients of the 32×32 array to calculate intermediate coefficients in the 32×64 array. The inverse quantization and inverse transform unit 204 performs the multiplication of the intermediate coefficients in 32×64 matrix form and the 64×32 orthogonal transform matrix to reconstruct the 64×64 array of prediction residuals.

The reconstructed prediction residuals are output to the image reconstruction unit 205. In the present exemplary embodiment, the quantization matrix to be used in the inverse quantization processing is determined in accordance with the size of the decoding target sub-block determined by the prediction information reconstructed by the decoding unit 203. More specifically, in the inverse quantization processing, the quantization matrix in FIG. 8B is used for the sub-block of the 32×32 array in FIG. 7B, and the quantization matrix in FIG. 8C is used for the sub-block of the 64×64 array in FIG. 7A. However, the quantization matrix to be used is not limited thereto and quantization matrices that are the same as those used by the transform and quantization unit 105 and the inverse quantization and inverse transform unit 106 in the first exemplary embodiment may be used.

The image reconstruction unit 205 acquires the data required for the prediction image reconstruction by referring to the frame memory 206 as appropriate based on the prediction information input from the decoding unit 203, and reconstructs the prediction image. In the present exemplary embodiment, the image reconstruction unit 205 uses two different prediction methods, namely, the intra prediction and the inter prediction, as in the prediction unit 104 in the first exemplary embodiment. As described above, a prediction method in which intra prediction and the inter prediction are combined may be used. The prediction processing is performed in sub-block units, as in the first exemplary embodiment.

Specific prediction processing is similar to that used by the prediction unit 104 in the first exemplary, and redundant descriptions thereof will be omitted. The image reconstruction unit 205 reconstructs image data from the prediction image generated by the prediction processing and the prediction residuals input from the inverse quantization and inverse transform unit 204. More specifically, the image reconstruction unit 205 reconstructs the image data by adding the prediction image and the prediction residuals. The reconstructed image data is stored in the frame memory 206 as appropriate. The stored image data is referred to in the prediction of other sub-blocks as appropriate.

The in-loop filter unit 207 reads the reconstruction target image from the frame memory 206 and performs the in-loop filter processing, such as deblocking filter, as in the in-loop filter unit 109 in FIG. 1. The filter-processed image is then input to the frame memory 206 again.

The reconstruction target image stored in the frame memory 206 is eventually output to the outside from the terminal 208. For example, the reconstruction target image is output to an external display apparatus.

Figure 4:
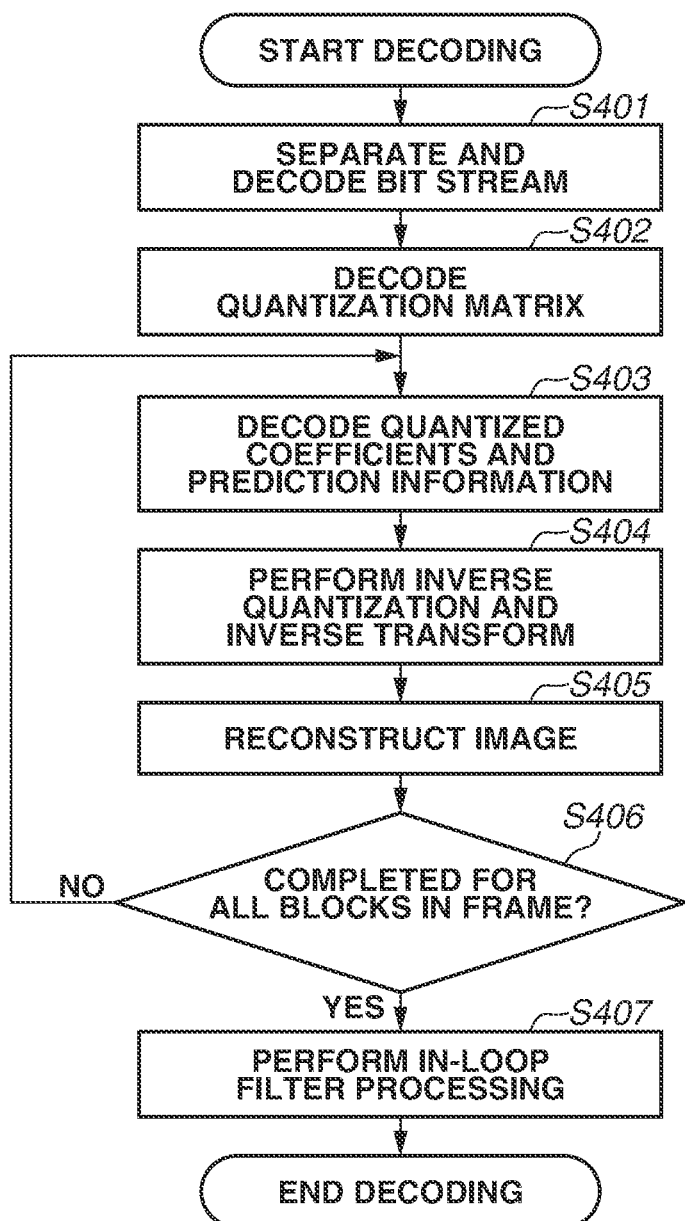
FIG. 4 is a flowchart illustrating image decoding processing in an image decoding apparatus according to the second exemplary embodiment.

FIG. 4 is a flowchart illustrating image decoding processing by the image decoding apparatus according to the second exemplary embodiment.

In step S401, the separation decoding unit 202 separates information about the decoding processing and the code data related to coefficients from the bit stream, and decodes the code data in the header section. More specifically, the separation decoding unit 202 reconstructs the quantization matrix code data.

In step S402, the quantization matrix decoding unit 209 initially decodes the quantization matrix code data reconstructed in step S401 to reconstruct the one-dimensional differential matrix illustrated in FIG. 10. Next, the quantization matrix decoding unit 209 reconstructs the two-dimensional base quantization matrix from the reconstructed one-dimensional differential matrix. The quantization matrix decoding unit 209 further expands the reconstructed two-dimensional base quantization matrix to generate a quantization matrix.

More specifically, in the present exemplary embodiment, the quantization matrix decoding unit 209 reconstructs the base quantization matrix illustrated in FIG. 8A by using the scanning method illustrated in FIG. 9 based on the differential matrix illustrated in FIG. 10. The quantization matrix decoding unit 209 further expands the reconstructed base quantization matrix to generate quantization matrices illustrated in FIGS. 8B and 8C, and stores the quantization matrices.

In step S403, the decoding unit 203 decodes the code data separated in step S401, to reconstruct the quantized coefficients and the prediction information. The decoding unit 203 further determines the size of the decoding target sub-block based on the decoded prediction information. In the present exemplary embodiment, the 32×32 array of quantized coefficients is reconstructed for each decoding target sub-block regardless of the size of the sub-block, i.e., whether the size is the 64×64 array as in FIG. 7A or the 32×32 array as in FIG. 7B.

In step S404, the inverse quantization and inverse transform unit 204 performs the inverse quantization on the quantized coefficients by using the quantization matrix reconstructed in step S402 to acquire the orthogonal transform coefficients, and performs the inverse orthogonal transform on the orthogonal transform coefficients to reconstruct the prediction residuals. In the present exemplary embodiment, the quantization matrix to be used in the inverse quantization processing is determined in accordance with the size of the decoding target sub-block determined by the prediction information reconstructed in step S403. More specifically, in the inverse quantization processing, the quantization matrix in FIG. 8B is used for each of the sub-blocks of the 32×32 array in FIG. 7B, and the quantization matrix in FIG. 8C is used for the sub-block of the 64×64 array in FIG. 7A. However, the quantization matrix to be used is not limited thereto as long as the same quantization matrices as those used in steps S306 and S307 of the first exemplary are used.

In step S405, the image reconstruction unit 205 reconstructs the prediction image from the prediction information generated in step S403. In the present exemplary embodiment, two types of prediction methods, namely, the intra prediction and the inter prediction, are used as in step S305 in the first exemplary embodiment. The image reconstruction unit 205 further reconstructs the image data from the reconstructed prediction image and the prediction residuals generated in step S404.

In step S406, the image decoding apparatus determines whether decoding is completed for all the basic blocks in the frame. If decoding is completed for all the basic blocks, the processing proceeds to step S407. If not, the processing returns to step S403 with the next basic block as a target.

In step S407, the in-loop filter unit 207 performs the in-loop filter processing on the image data reconstructed in step S405 to generate a filter-processed image. The processing then ends.

For the sub-blocks having been subjected to the quantization and encoding of only low-frequency orthogonal transform coefficients generated in the first exemplary embodiment, the above-described configuration and operation enable the control of the quantization for each frequency component by using a quantization matrix to decode a bit stream with improved subjective image quality. Moreover, for the sub-blocks of which only the low-frequency orthogonal transform coefficients are quantized and encoded, a bit stream for which optimum quantization control has been applied to its low frequency portion can be decoded by using a quantization matrix obtained by expanding only the low frequency portion of the base quantization matrix, such as that of FIG. 8C.

While in the configuration of the present exemplary embodiment, to reduce the code amount, only the base quantization matrix in FIG. 8A commonly used to generate the quantization matrices in FIGS. 8B and 8C are decoded, the quantization matrices themselves in FIGS. 8B and 8C may be decoded. This enables decoding of a bit stream with finer quantization control on each frequency component since distinctive values can be set for the respective frequency components of the quantization matrices.

In the configuration, an individual base quantization matrix can be set for each of the quantization matrices in FIGS. 8B and 8C, and each base quantization matrix can be encoded. In such a case, respective different quantization controls can be performed on the 32×32 array of orthogonal transform coefficients and the 64×64 array of orthogonal transform coefficients to decode a bit stream with which more elaborate control of subjective image quality is implemented. Furthermore, in such a case, the quantization matrix corresponding to the 64×64 array of orthogonal transform coefficients may be generated by quadrupling the entire base quantization matrix of the 8×8 array instead of octupling the top left 4×4 section of the base quantization matrix of the 8×8 array. This enables finer quantization control also on the 64×64 array of orthogonal transform coefficients.

In addition, while in the configuration of the present exemplary embodiment, the quantization matrix for a sub-block of the 64×64 array with zeroing out used is uniquely determined, an identifier may be introduced to make the quantization matrix selectable. For example, FIG. 6B illustrates a bit stream in which the quantization matrix encoding for a sub-block of the 64×64 array with zeroing out used is made selectable by newly introducing a quantization matrix encoding method information code. For example, in a case where the quantization matrix encoding method information code indicates 0, the independent quantization matrix as in FIG. 8C is used for the quantized coefficients corresponding to the sub-block of the 64×64 array with zeroing out used. In a case where the quantization matrix encoding method information code indicates 1, the quantization matrix for normal sub-blocks which are not to be zeroed out as in FIG. 8B is used for the sub-block of the 64×64 array with zeroing out used. In a case where the quantization matrix encoding method information code indicates 2, all the elements of the quantization matrix to be used for the sub-block of the 64×64 array with zeroing out used are encoded instead of those of the base quantization matrix of the 8×8 array. This enables decoding of the bit stream where a reduction in the amount of quantization matrix code and independent quantization control on a sub-block with zeroing out used are implemented in a selective manner.

While, in the present exemplary embodiment, the sub-blocks processed by zeroing out are only of the 64×64 array, the sub-blocks processed by zeroing out are not limited thereto. For example, the quantization matrix decoding unit 209 may be configured to decode, among the orthogonal transform coefficients corresponding to a sub-block of a 32×64 or 64×32 array illustrated in FIG. 7C or 7D, only the quantized coefficients in the upper half or left half without decoding the 32×32 array of orthogonal transform coefficients in the lower half or right half. In such a case, only the 32×32 array of orthogonal transform coefficients in the upper half or left half are to be decoded and inversely quantized. The quantization processing on the 32×32 array of orthogonal transform coefficients in the upper half or left half is performed by using a quantization matrix different from that of FIG. 8B.

Moreover, the configuration may be made such that the values of the respective quantization matrices corresponding to DC coefficients at the top left of the generated orthogonal transform coefficients, which presumably have the greatest impact on image quality, are decoded and set separately from the values of the elements of the base quantization matrix of the 8×8. FIGS. 12B and 12C illustrate examples where the value of the top leftmost element corresponding to the DC component is changed from those in FIGS. 8B and 8C. In such a case, the quantization matrices illustrated in FIGS. 12B and 12C can be set by decoding information indicating "2" at the position of the DC part in addition to the information about the base quantization matrix of FIG. 8A. This enables decoding of a bit stream with finer quantization control applied on the DC component of the orthogonal transform coefficient having the greatest impact on image quality.

Third Exemplary Embodiment

The above-described exemplary embodiments are based on the premise that each processing unit illustrated in FIGS. 1 and 2 are configured by hardware devices. However, processing to be performed by each processing unit in FIGS. 1 and 2 may be configured by computer programs.

Figure 5:
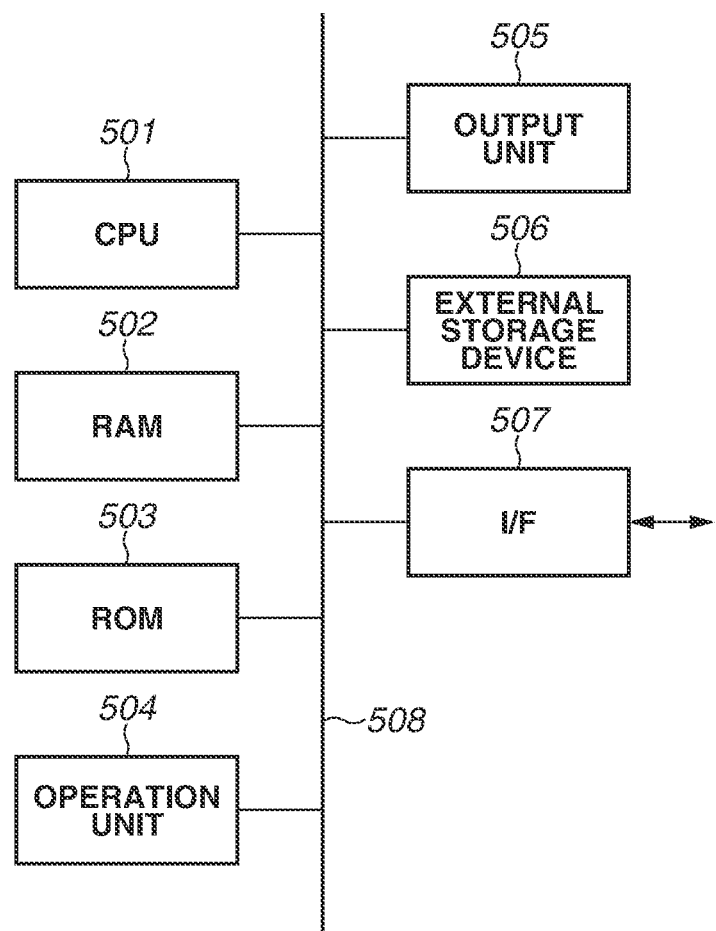
FIG. 5 is a block diagram illustrating an example of a hardware configuration of a computer applicable to the image encoding apparatus and the image decoding apparatus of the present invention.

FIG. 5 is a block diagram illustrating an example of a hardware configuration of a computer applicable to the image encoding apparatus and the image decoding apparatus according to each of the above-described exemplary embodiments.

A central processing unit (CPU) 501 controls the entire computer by using computer programs and data stored in a random access memory (RAM) 502 and a read only memory (ROM) 503 and at the same time performs the above-described processing performed by an apparatus according to each of the above-described exemplary embodiments. More specifically, the CPU 501 functions as each processing unit illustrated in FIGS. 1 and 2.

The RAM 502 includes an area for temporarily storing computer programs and data loaded from an external storage device 506, and data acquired from the outside via an interface (I/F) 507. The RAM 502 further includes a work area used for the CPU 501 to perform various pieces of processing. More specifically, for example, the RAM 502 can be allocated as a frame memory and can suitably provide other various areas.

The ROM 503 stores setting data and the boot program of the computer. An operation unit 504 includes a keyboard and a mouse. The user of the computer operates the operation unit 504 to input various instructions to the CPU 501. An output unit 505 outputs a result of processing performed by the CPU 501. The output unit 505 includes, for example, a liquid crystal display (LCD).

The external storage device 506 is a mass-storage information storage apparatus, which is represented by a hard disk drive apparatus. The external storage device 506 stores an operating system (OS) and computer programs for causing the CPU 501 to implement the function of each processing unit illustrated in FIGS. 1 and 2. The external storage device 506 may further store image data to be processed.

The computer programs and data stored in the external storage device 506 are suitably loaded into the RAM 502 under the control of the CPU 501, and then processed by the CPU 501. A network such as a local area network (LAN) and the Internet, a projection apparatus, a display apparatus, and other apparatuses can be connected to the I/F 507. The computer can acquire and send out various types of information via the I/F 507. A bus 508 connects the above-described processing units.

To implement operations of the thus-configured processing units, the CPU 501 serves as a center to control the operations described above with reference to the flowcharts.

Other Exemplary Embodiments

Each of the exemplary embodiments can also be achieved when a storage medium recording computer program codes for implementing the above-described functions is supplied to a system, and the system reads and executes the computer program codes. In this case, the computer program codes read from the storage medium implement functions of the above-described exemplary embodiments, and the storage medium storing the computer program codes constitutes the present invention. The present invention includes a case where the OS operating on the computer partially or entirely executes actual processing based on instructions of the program codes and the above-described functions are implemented by the processing.

The present invention may also be achieved in the following form. More specifically, computer program codes are read from a storage medium and then stored in a memory included in a function extension card inserted into the computer or a function extension unit connected thereto. The present invention includes a case where a CPU included in the function extension card or the function extension unit partially or entirely executes actual processing based on instructions of the computer program codes to implement any of the above-described functions.

In a case where the present invention is applied to the above-described storage medium, the storage medium stores codes of the computer program corresponding to the processing of the above-described flowcharts.

According to the foregoing exemplary embodiments, subjective image quality can be improved in a case where the technique of forcefully setting some of orthogonal transform coefficient to 0 is used by enabling quantization processing using a quantization matrix corresponding to the technique.

The present invention is not limited to the above-described exemplary embodiments but can be modified and changed in diverse ways without departing from the spirit and scope thereof. Therefore, the following claims are appended to disclose the scope of the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image decoding apparatus capable of decoding an image from a bitstream by using a plurality of blocks including a first block of a P×Q array of pixels, where P and Q are integers, and a second block of an N×M array of pixels, where N is an integer satisfying N<P, and M is an integer satisfying M<Q, the image decoding apparatus comprising:

a decoding unit configured to decode, from the bitstream, data corresponding to a first array of quantized transform coefficients corresponding to the first block and data corresponding to a second array of quantized transform coefficients corresponding to the second block;

an inverse quantization unit configured to derive a first array of transform coefficients representing frequency components from the first array of quantized transform coefficients by using a first quantization matrix of an N×M array of elements, and configured to derive a second array of transform coefficients representing frequency components from the second array of quantized transform coefficients by using a second quantization matrix of an N×M array of elements; and;

an inverse transform unit configured to derive a first array of prediction residuals corresponding to the first block by performing inverse transform processing on the first array of transform coefficients, and configured to derive a second array of prediction residuals corresponding to the second block by performing inverse transform processing on the second array of transform coefficients, wherein, in a case where a target block to be decoded is the first block, the inverse transform unit is configured to derive an N×Q array of intermediate values by performing multiplication of the first array of transform coefficients, which is an N×M array, and a matrix of an M×Q array, and to derive a P×Q array of prediction residuals for the first block by performing multiplication of a matrix of a P×N array and the N×Q array of intermediate values, wherein the first quantization matrix of an N×M array of elements includes a part of elements of a third quantization matrix of an R×S array of elements and does not include the other elements of the third quantization matrix, where R is an integer satisfying R≤N, and S is an integer satisfying S≤M, wherein the second quantization matrix of an N×M array of elements includes all elements of a fourth quantization matrix of an R×S array of elements, wherein the third quantization matrix is different from the fourth quantization matrix, wherein the first quantization matrix, except for an element corresponding to a DC component, consists of the part of elements of the third quantization matrix and wherein the second quantization matrix, except for an element corresponding to a DC component, consists of all elements of the fourth quantization matrix.

2. The image decoding apparatus according to claim 1, wherein the integers P and Q are 64, and the integers N and M are 32.

3. The image decoding apparatus according to claim 1, wherein the integers P and Q are 128, and the integers N and M are 32.

4. The image decoding apparatus according to claim 1, wherein the second block is a block of an N×M array of pixels.

5. The image decoding apparatus according to claim 1, wherein the first block is a non-square block.

6. A non-transitory computer readable storage medium storing a program for causing a computer to function as each unit of the image decoding apparatus according to claim 1.

7. An image decoding method in which an image is decodable from a bitstream by using a plurality of blocks including a first block of a P×Q array of pixels, where P and Q are integers, and a second block of an N×M array of pixels, where N is an integer satisfying N<P, and M is an integer satisfying M<Q, the image decoding method comprising:

decoding, from the bitstream, data corresponding to a first array of quantized transform coefficients corresponding to the first block and data corresponding to a second array of quantized transform coefficients corresponding to the second block;

deriving a first array of transform coefficients representing frequency components from the first array of quantized transform coefficients by using a first quantization matrix of an N×M array of elements, and deriving a second array of transform coefficients representing frequency components from the second array of quantized transform coefficients by using a second quantization matrix of an N×M array of elements; and deriving a first array of prediction residuals corresponding to the first block by performing inverse transform processing on the first array of transform coefficients, and deriving a second array of prediction residuals corresponding to the second block by performing inverse transform processing on the second array of transform coefficients, wherein, in a case where a target block to be decoded is the first block, an N×Q array of intermediate values is derived by performing multiplication of the first array of transform coefficients, which is an N×M array, and a matrix of an M×Q array, and a P×Q array of prediction residuals for the first block is derived by performing multiplication of a matrix of a P×N array and the N×Q array of intermediate values, wherein the first quantization matrix of an N×M array of elements includes a part of elements of a third quantization matrix of an R×S array of elements and does not include the other elements of the third quantization matrix, where R is an integer satisfying R≤N, and S is an integer satisfying S≤M, wherein the second quantization matrix of an N×M array of elements includes all elements of a fourth quantization matrix of an R×S array of elements, wherein the third quantization matrix is different from the fourth quantization matrix, wherein the first quantization matrix, except for an element corresponding to a DC component, consists of the part of elements of the third quantization matrix, and wherein the second quantization matrix, except for an element corresponding to a DC component, consists of all elements of the fourth quantization matrix.

8. The image decoding method according to claim 7, wherein the integers P and Q are 64, and the integers N and M are 32.

9. The image decoding method according to claim 7, wherein the integers P and Q are 128, and the integers N and M are 32.

10. The image decoding method according to claim 7, wherein the second block is a block of an N×M array of pixels.

11. The image decoding method according to claim 7, wherein the first block is a non-square block.

* * * * *